(12) United States Patent
Sankaran et al.

(10) Patent No.: US 8,855,071 B1
(45) Date of Patent: Oct. 7, 2014

(54) HANDLING ERRORS IN SUBSCRIBER SESSION MANAGEMENT WITHIN MOBILE NETWORKS

(75) Inventors: Krishna Sankaran, Milpitas, CA (US); Sureshkannan Duraisamy, Sunnyvale, CA (US); Himanshu Shah, Milpitas, CA (US); Venkatesh Gota, San Jose, CA (US); Venkatesan Natarajan, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 346 days.

(21) Appl. No.: 13/343,614

(22) Filed: Jan. 4, 2012

(51) Int. Cl.
*H04W 4/00* (2009.01)
*H04J 3/24* (2006.01)
*H04L 12/28* (2006.01)

(52) U.S. Cl.
USPC .......................... 370/329; 370/349; 370/389

(58) Field of Classification Search
None
See application file for complete search history.

(56) References Cited

U.S. PATENT DOCUMENTS

| | | | | |
|---|---|---|---|---|
| 2003/0081607 | A1* | 5/2003 | Kavanagh | 370/392 |
| 2007/0091862 | A1* | 4/2007 | Ioannidis | 370/338 |
| 2008/0044181 | A1 | 2/2008 | Sindhu | |
| 2008/0112396 | A1* | 5/2008 | Hurtta | 370/352 |
| 2011/0235595 | A1* | 9/2011 | Mehta et al. | 370/329 |

OTHER PUBLICATIONS

3GPP TS 29.281, V9.3.0, 3rd Generation Partnership Project; Technical Specification Group Core Network and Terminals; General Packet Radio System (GPRS) Tunnelling Protocol User Plane (GTPv1-U) (Release 9), Jun. 2010, 24 pp.
3GPP TS 23.401, V10.0.0, 3rd Generation Partnership Project; Technical Specification Group Services and System Aspects; General Packet Radio Service (GPRS) enhancements for Evolved Universal Terrestrial Radio Access Network (E-UTRAN) access (Release 10), Jun. 2010, 261 pp.
3GPP TS 36.300, V10.0.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Jun. 2010, 183 pp.
U.S. Appl. No. 12/182,619, by Jerome P. Moisand, filed Jul. 30, 2008.
U.S. Appl. No. 13/172,556, by Apurva Mehta, filed Jun. 29, 2011.

* cited by examiner

*Primary Examiner* — Kwang Yao
*Assistant Examiner* — Jutai Kao
(74) *Attorney, Agent, or Firm* — Shumaker & Sieffert, P.A.

(57) ABSTRACT

In general, techniques are described for handling errors in subscriber session management within mobile networks. A downstream mobile gateway comprising a forwarding unit and a service unit may implement the techniques. The forwarding unit receives a packet that includes a destination address for a subscriber and a tunnel endpoint identifier (TEID). The service unit determines whether the TEID is associated with one of a number of subscriber records that store session data for current sessions associated with subscriber devices to communicate with the mobile network. In response to determining that the TEID is not associated with one of the subscriber records, the service unit generates a message that includes the TEID and the destination address and indicates that the downstream mobile gateway has determined that the TEID is not associated with one of the subscriber records. The forwarding unit then sends the message to the upstream mobile gateway.

35 Claims, 7 Drawing Sheets

HANDLING ERRORS IN SUBSCRIBER SESSION MANAGEMENT WITHIN MOBILE NETWORKS

TECHNICAL FIELD

The invention relates to mobile networks and, more specifically, handling errors in mobile networks.

BACKGROUND

A cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile service provider networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, a Universal Mobile Telecommunications System (UMTS), an evolution of UMTS referred to as Long Term Evolution (LTE), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical 3GPP mobile service provider network, or mobile network, includes a core packet-switched network, a transport network, and one or more radio access networks (RANs). The core packet-switched network for the mobile network establishes logical connections, known as bearers, among the many service nodes on a path between a wireless device, attached to one of the radio access networks, and a packet data network (PDN). The service nodes then utilize the bearers to transport subscriber traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange service data with application or other servers of the PDNs.

In forming these bearers, the service nodes may establish a tunnel to support the bearers. In order to establish these tunnels, one service node acting as an endpoint for each tunnel may signal a tunnel endpoint identifier (TEID) instructing the other service node acting as the other endpoint of the tunnel to be established of the TEID to use when sending subscriber traffic via this tunnel. The receiving endpoint service node may then associate the signal TEID with the subscriber device (often, by associating the TEID with an Internet Protocol (IP) address assigned to the subscriber device in what is commonly referred to as a subscriber record). A service node may, however, not receive this TEID or otherwise associate this TEID with the corresponding subscriber device for any number of reasons (including dropping the packet signaling this TEID, a failure of the receiving endpoint service node, etc.).

If the association is not established, this endpoint subscriber device, upon receiving a packet sent through this tunnel having the unknown (at least from the perspective of the receiving endpoint service node for which no association is maintained) TEID, may issue an error indication packet to the service node that sent the packet having this unknown TEID identifying the received TEID as unknown (meaning that the service node that received the packet having this TEID has not associated this with a subscriber device). In response to receiving this error indication packet, the sending service node may perform a linear scan of subscriber records to determine to which subscriber device this TEID is associated. In large scale mobile networks having hundreds of thousands or even a million or more subscribers, the service node may be required to assess potentially hundreds of thousands or even a million or more subscriber records to identify to which subscriber the TEID specified in the error indication packet is associated. Consequently, handling of such error indication packets identifying unknown TEIDs may be time-consuming and require significant resources in terms of processor cycles and memory, which may delay delivery of subscriber traffic and otherwise impact the user experience associated with providing data services via the mobile network.

SUMMARY

In general, techniques are described for sending additional information in error indication packets that may facilitate a more efficient lookup of subscriber records in comparison to the conventional subscriber record scan. Rather than send a unknown tunnel endpoint identifier (TEID) in the error indication packets without providing much in the way of additional information that may enable more efficient forms of identifying the subscriber device, the techniques may enable a service node, such as a router, to determine additional information, commonly in the form of an Internet protocol (IP) address assigned to the subscriber device, in response to the failure to locate a subscriber record associated with the TEID and send this subscriber IP address in addition to the unknown TEID. By providing this additional information, the service node receiving this error indication packet may perform a more efficient lookup of the subscriber record (in comparison to the conventional linear subscriber record scan) using the IP address, as the receiving service node typically maintains a hash table mapping IP addresses to corresponding subscriber records. By enabling use of the hash table to identify the subscriber records, the techniques may significantly reduce the number of operations required to identify a subscriber record in comparison to the conventional linear subscriber record scan.

In one embodiment, a method comprises receiving, with a downstream mobile gateway of a mobile network, a packet destined for one of a plurality of subscribers in the mobile network, wherein the packet is received from an upstream mobile gateway and includes a destination address for the one of the plurality of subscribers and a tunnel endpoint identifier (TEID) that identifies a tunnel between the downstream mobile gateway and the upstream mobile gateway and determining, with the downstream mobile gateway, whether the TEID is associated with one of a plurality of subscriber records maintained by the downstream mobile gateway that store session data for sessions associated with the plurality of subscriber devices to communicate with the mobile network. The method also comprises, in response to determining that the TEID is not associated with one of the plurality of subscriber records, generating, with the downstream mobile gateway, a message that includes both the TEID and the destination address and indicates that the downstream mobile gateway has determined that the TEID is not associated with one of the subscriber records for the current sessions and sending, with the downstream mobile gateway, the message to the upstream mobile gateway.

In another embodiment, a downstream mobile gateway of a mobile network comprises at least one forwarding unit that receives a packet destined for one of a plurality of subscribers in the mobile network, wherein the packet is received from an upstream mobile gateway and includes a destination address for the one of the plurality of subscribers and a tunnel endpoint identifier (TEID) that identifies a tunnel between the downstream mobile gateway and a upstream mobile gateway. The downstream mobile gateway also comprises a service unit that determines whether the TEID is associated with one of a plurality of subscriber records maintained by the downstream mobile gateway that store session data for current sessions associated with the plurality of subscriber devices to communicate with the mobile network and, in response to determining that the TEID is not associated with one of the plurality of subscriber records, generates a message that includes both the TEID and the destination address and indicates that the downstream mobile gateway has determined that the TEID is not associated with one of the subscriber records for the current sessions. The forwarding unit sends the message to the upstream mobile gateway.

In another embodiment, a non-transitory computer-readable medium comprising instructions that, when executed, cause one or more processors of a downstream mobile gateway of a mobile network to receive a packet destined for one of a plurality of subscribers in the mobile network, wherein the packet is received from an upstream mobile gateway and includes a destination address for the one of the plurality of subscribers and a tunnel endpoint identifier (TEID) that identifies a tunnel between the downstream mobile gateway and the upstream mobile gateway, determine whether the TEID is associated with one of a plurality of subscriber records maintained by the downstream mobile gateway that store session data for sessions associated with the plurality of subscriber devices to communicate with the mobile network, in response to determining that the TEID is not associated with one of the plurality of subscriber records, generate a message that includes both the TEID and the destination address and indicates that the downstream mobile gateway has determined that the TEID is not associated with one of the subscriber records for the current sessions and send the message to the upstream mobile gateway.

In another embodiment, a method comprises establishing, with an upstream mobile gateway of a mobile network, a plurality of tunnels between the upstream mobile gateway and a downstream mobile gateway that each support a session between a plurality of subscriber devices and the mobile network and maintaining, with the upstream mobile gateway, a subscriber record for each of the plurality of subscriber devices that store session data for sessions associated with the plurality of subscriber devices to communicate with the mobile network. The method also comprises receiving, with the upstream mobile gateway, a message from the downstream mobile gateway that includes a destination address associated with one of the subscriber devices and a tunnel endpoint identifier (TEID) that identifies one of the plurality of tunnels and indicates that the downstream mobile gateway has determined that the included TEID is not associated with one of the subscriber records maintained by the downstream gateway device, performing, with the upstream mobile gateway, a lookup based on the destination address included within the message to identify one of the plurality of subscriber records maintained by the upstream mobile gateway that is associated with the destination address and the included TEID and deleting, with the upstream mobile gateway, the identified one of the plurality of subscriber records maintained by the upstream mobile gateway and associated with the destination address to remove the session between the corresponding one of the plurality of subscriber devices and the mobile network.

In another embodiment, an upstream mobile gateway of a mobile network comprises at least one service unit and a forwarding unit. The at least one service unit establishes a plurality of tunnels between the upstream mobile gateway and a downstream mobile gateway that each support a session between a plurality of subscriber devices and the mobile network, and maintains a subscriber record for each of the plurality of subscriber devices that store session data for sessions associated with the plurality of subscriber devices to communicate with the mobile network. The forwarding unit receives a message that includes a destination address associated with one of the subscriber devices and a tunnel endpoint identifier (TEID) that identifies one of the plurality of tunnels and indicates that the downstream mobile gateway has determined that the included TEID is not associated with one of the subscriber records maintained by the downstream gateway device and performs a lookup based on the destination address included within the message to identify one of the plurality of subscriber records maintained by the upstream mobile gateway that is associated with the destination address and the included TEID. The at least one service unit deletes the identified one of the plurality of subscriber records maintained by the upstream mobile gateway and associated with the destination address to remove the session between the corresponding one of the plurality of subscriber devices and the mobile network.

In another embodiment, a non-transitory computer-readable medium comprises instruction that, when executed, cause one or more processors of an upstream mobile gateway of a mobile network to establish a plurality of tunnels between the upstream mobile gateway and a downstream mobile gateway that each support a session between a plurality of subscriber devices and the mobile network, maintain a subscriber record for each of the plurality of subscriber devices that store session data for sessions associated with the plurality of subscriber devices to communicate with the mobile network, receive a message that includes a destination address associated with one of the subscriber devices and a tunnel endpoint identifier (TEID) that identifies one of the plurality of tunnels and indicates that the downstream mobile gateway has determined that the included TEID is not associated with one of the subscriber records maintained by the downstream gateway device, perform a lookup based on the destination address included within the message to identify one of the plurality of subscriber records maintained by the upstream mobile gateway that is associated with the destination address and the included TEID and delete the identified one of the plurality of subscriber records maintained by the upstream mobile gateway and associated with the destination address to remove the session between the corresponding one of the plurality of subscriber devices and the mobile network.

In another embodiment, a network system comprises a mobile network that includes a plurality of subscriber devices, a downstream mobile gateway and an upstream mobile gateway that comprises includes at least one service unit that establishes a plurality of tunnels between the upstream mobile gateway and the downstream mobile gateway that each support a session between the plurality of subscriber devices and the mobile network, and maintains a subscriber record for each of the plurality of subscriber devices that store session data for sessions associated with the plurality of subscriber devices to communicate with the mobile network. The downstream mobile gateway includes at least one forwarding unit that receives a packet destined for one of the plurality of subscribers, wherein the packet is received from the upstream mobile gateway and includes a destination address for the one of the plurality of subscribers and a tunnel endpoint identifier (TEID) that identifies a tunnel between the downstream mobile gateway and the upstream mobile gateway and a service unit that determines whether the TEID is associated with one of a plurality of subscriber records maintained by the downstream mobile gateway that store session data for current sessions associated with the plurality of subscriber devices to communicate with the mobile network and, in response to determining that the TEID is not associated with one of the plurality of subscriber records, generates a message that includes both the TEID and the destination address and indicates that the downstream mobile gateway has determined that the TEID is not associated with one of the subscriber records for the current sessions. The forwarding unit of the downstream mobile gateway sends the message to the upstream mobile gateway. The upstream mobile gateway further includes a forwarding unit that receives the message and performs a lookup based on the destination address included within the message to identify one of the plurality of subscriber records maintained by the upstream mobile gateway that is associated with the destination address and the included TEID. The at least one service unit of the upstream mobile gateway deletes the identified one of the plurality of subscriber records maintained by the upstream mobile gateway and associated with the destination address to remove the session between the corresponding one of the plurality of subscriber devices and the mobile network.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
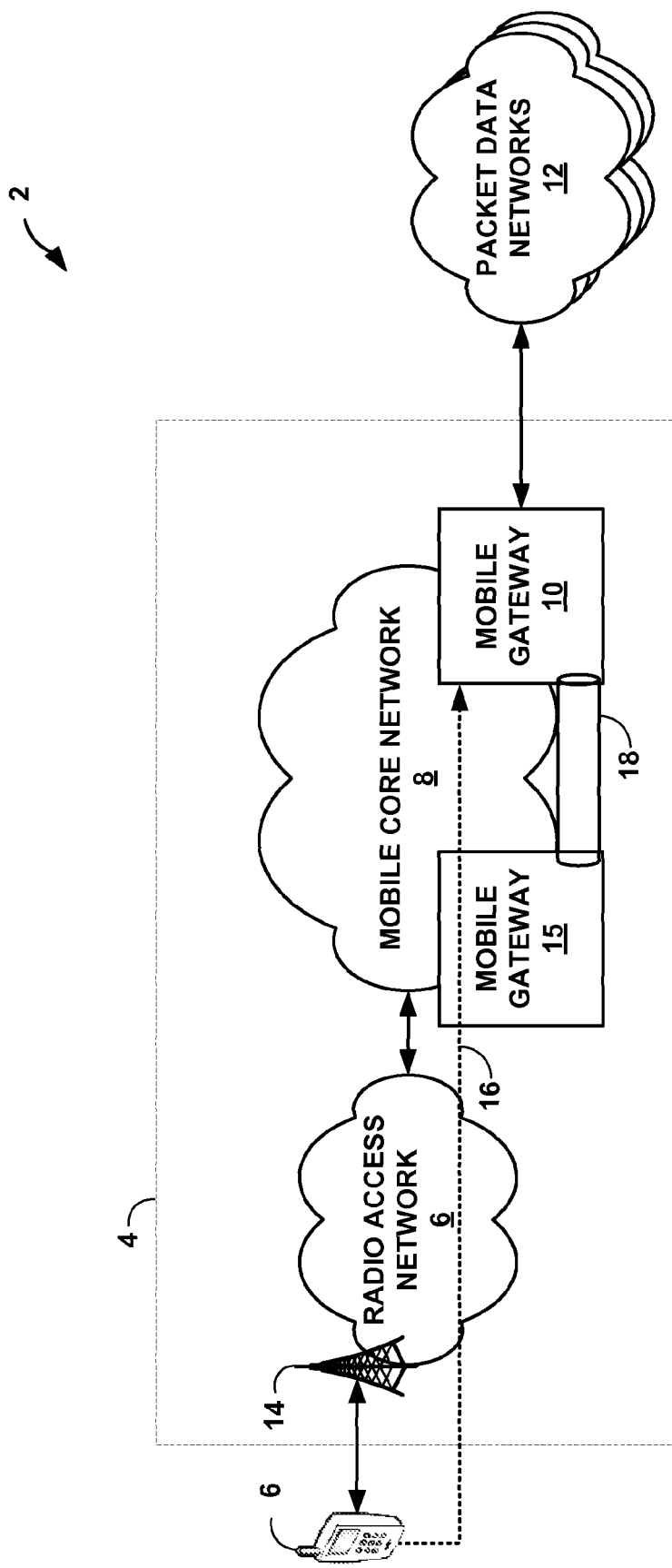
FIG. 1 is a block diagram illustrating an example network system that facilitate more efficient lookups in response to error indication messages according to the techniques described in this disclosure.

FIG. 1 is a block diagram illustrating an example network system 2 that facilitate more efficient lookups in response to error indication messages according to the techniques described in this disclosure. In this example, network system 2 comprises packet data networks (PDNs) 12 coupled to mobile service provider network 4. Each of PDNs 12 support one or more packet-based services that are available for request and use by wireless device 6. As examples, PDNs 12 may provide, for example, bulk data delivery, voice over Internet protocol (VoIP), Internet protocol television (IPTV), Short Messaging Service (SMS), Wireless Application Protocol (WAP) service, or customer-specific application services. PDNs 12 may each comprise, for instance, a local area network (LAN), a wide area network (WAN), the Internet, a virtual LAN (VLAN), an enterprise LAN, a layer 3 virtual private network (VPN), an Internet Protocol (IP) intranet operated by the mobile service provider that operates mobile service provider network 4, an enterprise IP network, or some combination thereof. In various embodiments, each of PDNs 12 is connected to a public WAN, the Internet, or to other networks. PDNs 12 each execute one or more packet data protocols (PDPs), such as IP (IPv4 and/or IPv6), X.25 or Point-to-Point Protocol (PPP), to enable packet transport for available services.

Wireless device 6 is a wireless communication device that may comprise, to provide a few examples, a utility meter, a security device such as a motion detector or door lock, a light, a mobile telephone, a laptop, tablet or desktop computer having, e.g., a 3G wireless card, a wireless-capable netbook, a video game device, a pager, a cellular phone (including so-called "smart phones"), or a personal data assistant (PDA). Wireless device 6 may run one or more applications, such as metering applications, listeners, mobile telephony applications, video games, videoconferencing applications, and email clients, among others. Certain applications running on wireless device 6 may require access to services offered by one or more of PDNs 12. Wireless device 6 may also be referred to, in various architectural embodiments, as User Equipment (UE) or a Mobile Station (MS).

A service provider operates mobile service provider network 4 to provide network access, data transport and other services to wireless device 6. In general, mobile service provider network 4 may implement any commonly defined cellular network architecture including those defined by standards bodies, such as a Global System for Mobile communication (GSM) Association, a 3$^{rd}$ Generation Partnership Project (3GPP), a 3$^{rd}$ Generation Partnership Project 2 (3GGP/2), an Internet Engineering Task Force (IETF) and a Worldwide Interoperability for Microwave Access (WiMAX) forum. For example, mobile service provider network 4 may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GPP. Mobile service provider network 4 may, alternatively or in conjunction with one of the above, implement a code division multiple access-2000 ("CDMA2000") architecture or Enhanced Data Rates for GSM Evolution (EDGE) architecture. Mobile service provider network 4 may, again as an alternative or in conjunction with one or more of the above, implement a WiMAX architecture defined by the WiMAX forum.

Mobile service provider network 4 comprises mobile core network 8 and radio access network 7. Wireless device 6 communicates using wireless links to base station 14 of radio access network 7 to access mobile service provider network 4. Although not shown in the example of FIG. 1, mobile service provider network 4 may, in some embodiments, include multiple radio access network coupled to mobile core network 8.

Mobile core network 8 and radio access network 7 may communicate over a backhaul network (not shown in the example of FIG. 1 for ease of illustration purposes) that includes land-based transmission lines, frequently leased by a service provider for mobile service provider network, to transport mobile data and control traffic between base station 4 and mobile gateway 10. The backhaul network also includes network devices such as aggregation devices and routers.

Mobile core network 8 provides session management, mobility management, and transport services between radio access network 7 and PDNs 12 to support access, by wireless device 6, to services provided by PDNs 12. Mobile core network 8 is coupled to PDNs 12 via respective communication links and associated interfaces of mobile gateway 10. Mobile core network 8 may comprise, for instance, a general packet radio service (GPRS) core packed-switched network, a GPRS core circuit-switched network, an IP-based mobile multimedia core network, or an evolved packet core (EPC). Mobile core network 8 comprises one or more packet processing nodes to support firewall, load balancing, billing, deep-packet inspection (DPI), and other services for mobile traffic traversing the mobile core network. Mobile gateway 10 operates as a PDN-facing upstream gateway to one or more of PDNs 12. Examples of mobile gateway 10 comprise a gateway GPRS support node (GGSN), an access gateway (aGW), or a PDN gateway (PGW). Mobile gateway 10 may each comprise a router that executes routing protocols to identify routes through mobile core network 8 or PDN 12 to various destinations.

Mobile core network 8 also includes a subscriber-facing mobile gateway 15 that is downstream from mobile gateway 10. For this reason, mobile gateway 15 may be referred to as a "downstream mobile gateway," while mobile gateway 10 may be referred to as an "upstream mobile gateway." Mobile gateway 15 operates in concert or alongside with mobile gateway 10 to support access by wireless device 6 to services provided by PNDs 12. Examples of mobile gateway 15 may comprise a serving GPRS support node (SGSN) or a serving gateway (SGW). Typically, mobile gateway 15 also interfaces with one or more radio network controller (RNCs) of radio access network 16 to support access by wireless device 6 to the services provided by PNDs 12. While not shown in the example of FIG. 1 for ease of illustration purposes, one of these RNCs may control base station 14.

Radio access network 7 connects wireless device 6 to mobile core network 8 and provides access control, packet routing and transfer, mobility management, security, radio resource management, and network management. Radio access network 7 may comprise, for example, a GSM Radio Access Network (GRAN), a WiMAX radio access network, a UMTS Radio Access Network (UTRAN), or an evolution of a UTRAN known as an E-UTRAN. Base station 14 may comprise a Node B, an evolved Node B (or "eNodeB"), or wireless access point, for example. Other embodiments of radio access network 7 may include additional base stations, as well as intermediate devices such as radio network controllers (RNCs), which are not shown in the example of FIG. 1, again, for ease of illustration purposes.

Mobile core network 8, radio access network 7, and wireless device 6 cooperate to establish and operate bearers that, in combination, constitute one or more service bearers to transport mobile traffic, in the form of PDP packet data units (PDUs), between wireless device 6 and one or more of PDNs 12. In general, a bearer is a set of network resources and data transport functions in mobile service provider network 4 to deliver user traffic between two network entities. A bearer may include a path, a logical connection, or a physical or wireless connection between two network devices. A bearer may comprise, for example, an Evolved Packet System (EPS) bearer. Further details regarding bearer setup and management are found in "3GPP TS 23.401-General Packet Radio Service (GPRS) enhancements for Evolved Universal Terrestrial Radio Access Network (E-UTRAN) Access," version 10.0.0, 3rd Generation Partnership Project, Technical Specification Group Services and System Aspects, June 2010, and "3GPP TS 36.300-Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, June 2010, the entire contents of each being incorporated herein by reference. For example, a particular service bearer between wireless device 6 and one of PDNs 12 may be operated according to session data and various protocols executing on wireless device 6, elements of radio access network 7, and elements of mobile core network 8 including mobile gateways 10, 15. A service bearer may be composed of multiple sub-bearers connecting individual elements that operate the respective sub-bearers to implement the service bearer.

To initiate establishment of a service bearer to access services provided by one of PDNs 12, wireless device 6 issues a session request 16 toward mobile service provider network 4. Session request 16 includes a wireless identity that identifies wireless device 6 to mobile service provider network 4. The wireless identity may represent, for example, an International Mobile Subscriber Identity (IMSI), a Temporary Mobile Subscriber Identity (TMSI), a P-TMSI, a System Architecture Evolution (SAE) TMSI or S-TMSI, an International Mobile Equipment Identity (IMEI), a subscriber username, a Mobile Subscriber Integrated Services Digital Network (MSISDN) Number or other data identifying wireless device 6.

Radio access network 7 delivers session request 16 to mobile core network 8, where mobile gateway 15 cooperates with mobile gateway 10 to service the session request. While illustrated in FIG. 1 as a single message from wireless device 6 to mobile gateway 10A, session request 16 may represent a plurality of messages that traverse intermediate network devices of radio access network 7 and mobile core network 8 to facilitate establishing a service bearer between wireless device 6 and mobile gateway 10. For example, in an LTE architecture, session request 16 may represent an initial Attach Request message issued by wireless device 6 to an eNode B represented by base station 14, which forwards the request to an MME of mobile core network 8. The MME may incorporate information received in the Attach Request message, including the wireless device identity, into a first Create Session Request message (also represented by session request 16) that the MME then sends to mobile gateway 15 of mobile core network 8. Mobile gateway 15 generates a second Create Session Request message that incorporates information received by mobile gateway 15 in the first Create Session Request, such as the wireless device identity. The second Create Session Request message, which is sent by mobile gateway 15 to mobile gateway 10 operating as a PGW of an EPC of an LTE network, is also represented by session request 16.

As another example, session request 16 may represent an Activate PDP Context Request message from wireless device 6 to mobile gateway 15 operating as an SGSN of mobile core network 8 and a Create PDP Context Request message from the SGSN to mobile gateway 10 operating as a GGSN. Other mobile network architectures may have similar messaging schemes to establish a requested session between wireless device 6 to mobile gateway 10A. In addition, the initial Attach Request or Active PDP Context Request message may be responsive to a request by mobile gateway 10 to wireless device 6 to initiate a session with one of PDNs 12.

As noted above, these service bearers may comprise sub-bearers, which may first be established to support each of the service bearers. Establishing these sub-bearers often involves configuring tunnels between each of the devices to logically separate the traffic associated with one service bearer from the other service bearers. As an example, mobile gateway 15 may establish tunnel 18 between mobile gateway 15 and mobile gateway 10, each of which represents an endpoint for tunnel 18. When forming tunnel 18, mobile gateway 15 signals a tunnel endpoint identifier (TEID) instructing mobile gateway 10 of the TEID to use when sending subscriber traffic via tunnel 18 to mobile gateway 15. Mobile gateway 10 may then associate the signaled TEID with a subscriber record associated with the corresponding subscriber device. Likewise, mobile gateway 10 may assign a separate TEID to tunnel 18 and signal this separate TEID to mobile gateway 15 indicating that mobile gateway 15 should use this separate TEID when sending traffic upstream from mobile gateway 15 to mobile gateway 10. Thus, mobile gateway 15 may signal a downstream TEID that mobile gateway 10 should use when sending subscriber traffic associated with tunnel 18 downstream from mobile gateway 10 to mobile gateway 15, while mobile gateway 10 may signal an upstream TEID that mobile gateway 15 should use when sending subscriber traffic associated with tunnel 18 upstream from mobile gateway 15 to mobile gateway 10.

Assuming tunnel 18 is established for wireless device 6, as one example, each of mobile gateways 10, 15 stores the association between tunnel 18 and wireless device 6 in a subscriber record associated with wireless device 6. The subscriber record is commonly associated with an identifier identifying wireless device 6. For example, each of mobile gateways 10 and 15 may associate each subscriber record with a MSIDN, IMSI or TMSI identifying wireless device 6. Mobile gateway 15 may parse this identifier assigned to wireless device 6 and retrieve the corresponding subscriber record based on this identifier. If no record exists, mobile gateway 15 may create a new subscriber record, associating this new subscriber record with the identifier identifying wireless device 6 within mobile network 2.

Mobile gateway 15 commonly indexes the subscriber records based on such subscriber identifiers to promote fast subscriber record retrieval (which is commonly referred to as "lookups"). Typically, mobile gateway 15 employs some form of an indexing data structure, such as a tree, hash function, or hash table, to implement this index. Mobile gateway 15 may then associate the downstream TEID (which it allocated to tunnel 18) to the retrieved subscriber record. Mobile gateway 15 may additionally index the subscriber records based on the allocated downstream TEID to promote improved subscriber record retrieval based on the allocated downstream TEID using a hash function, hash table or other common indexing mechanism. Mobile gateway 15 may also store the upstream TEID to this subscriber record, where again this upstream TEID refers to the TEID allocated by mobile gateway 10 for use in transmitting traffic associated with wireless device 6 upstream from mobile gateway 15 to mobile gateway 10.

Mobile gateway 15 typically does not index subscriber records based on this upstream TEID as these types of TEIDs are not allocated by mobile gateway 15 and may change frequently, requiring extensive resources (e.g., memory and processing cycles) to maintain accurate indexes for the upstream TEID. In addition, the TEIDs are not assigned by the device performing the indexing and, as a result, the same TEIDs may be used by different devices, which in turn may prevent or at least increase the complexity of indexing subscriber records based on the upstream TEIDs. For example, additional information may be required to properly index TEIDs, such as the peer IP address or other information that uniquely identifies the device that assigned the TEID to the tunnel, further complicating the indexing process.

Similar to mobile gateway 15, mobile gateway 10 may parse the identifier assigned to wireless device 6 from session request 15 and retrieve the corresponding subscriber record based on this identifier. If no record exists, mobile gateway 10 may create a new subscriber record, associating this new subscriber record with the parsed identifier. Mobile gateway 10 commonly indexes the subscriber records based on the identifier to promote fast subscriber record retrieval. Typically, mobile gateway 10 employs some form of an indexing data structure, such as a tree, hash function, or hash table, to implement this index. Mobile gateway 10 may then associate the upstream TEID (which it allocated to tunnel 18) to the retrieved subscriber record. Mobile gateway 10 may additionally index the subscriber records based on this allocated upstream TEID to promote improved subscriber record retrieval. Mobile gateway 15 may also store the downstream TEID to this subscriber record, where again this downstream TEID refers to the TEID allocated by mobile gateway 15 for use in transmitting traffic associated with wireless device 6 downstream from mobile gateway 10 to mobile gateway 15. Mobile gateway 15 typically does not index subscriber records based on this downstream TEID as these types of TEIDs are not allocated by mobile gateway 15 and may change frequently, requiring extensive resources (e.g., memory and processing cycles) to maintain accurate indexes for the downstream TEID.

Once tunnel 18 is established and the session is formed, mobile gateway 10 may allocated an IP address to wireless device 6 for use in accessing the one of PDNs 12. Mobile gateway 10 may store this IP address to the subscriber record maintained for this wireless device 6, effectively associating the IP address with wireless device 6. Mobile gateway 10 may additionally index subscriber records based on this allocate IP address to facilitate fast lookup of subscriber records based on this IP address, as mobile gateway 10 typically lookups subscriber records based on IP addresses in response to receiving packets that include these allocated IP addresses from PDNs 12 destined for wireless devices, such as wireless device 6. Mobile gateway 10 performs these subscriber record lookups to identify the downstream TEID, which it then uses to encapsulate each of these packets. Mobile gateway 15 does not typically index its subscriber records based on IP addresses assigned to wireless devices as it forwards packets based on TEIDs rather than IP addresses.

In some instances, one of mobile gateways 10, 15 may not associate the TEID allocated by the other one of mobile gateways 10, 15 with the corresponding subscriber record, which may impact operations of mobile network 2. To illustrate, mobile gateway 15 may fail when establishing tunnel 18 after receiving the upstream TEID allocated by mobile gateway 10 for use when sending corresponding subscriber traffic upstream via tunnel 18 to mobile gateway 10. Mobile gateway 15 may, however, have signaled the downstream TEID for tunnel 18 to mobile gateway 10, which may, from the perspective of mobile gateway 10, have established tunnel 18. Mobile gateway 10 may then utilize this tunnel 18 to transmit packets downstream to wireless device 6, appending the downstream TEID in a tunnel header encapsulating each of the packets. Mobile gateway 15 may receive these packets and attempt to perform a lookup of the subscriber record using the downstream TEID, but is unable to locate a subscriber record associated with this downstream TEID because, from the perspective of mobile gateway 15, the tunnel was not established as a result of mobile gateway 15 failing during the establishment of tunnel 18. That is, mobile gateway 15 deleted the association between downstream TEID and the subscriber record when recovering from the failure as mobile gateway 15 failed to associate an upstream TEID with tunnel 18.

If the association is not established, mobile gateway 15, upon receiving a packet sent through tunnel 18 having the unknown (at least from the perspective of mobile gateway 15) TEID, may issue an error indication packet to mobile gateway 10 indicating that the received TEID as unknown (meaning, for example, that mobile gateway 15 that received the packet having this TEID has not associated this with any one of its subscriber records). In response to receiving this error indication packet, mobile gateway 10 may perform a linear scan of subscriber records to determine to which subscriber device this TEID is associated. In large mobile networks having hundreds of thousands or even a million or more subscriber devices, gateway 10 may be required to assess potentially hundreds of thousands or even a million or more subscriber records to identify to which subscriber the TEID specified in the error indication packet is associated. Consequently, handling of such error indication packets identifying unknown TEIDs may be time-consuming and require significant resources in terms of processor cycles and memory, which may delay delivery of subscriber traffic and otherwise impact the user experience associated with providing data services via the mobile network.

Moreover, mobile gateway 15 may process hundreds or potentially thousands of session requests similar to session request 16 concurrently, leading to hundreds of potentially thousands of error indication packets that further compound the issues with handling of such error indication packets by mobile gateway 10. In addition, although not shown in the example of FIG. 1, mobile gateway 10 may interface with multiple mobile gateways similar to mobile gateway 15, each of which may receive hundreds or potentially thousands of session requests similar to session request 16 concurrently, which may further scale the issues of handling such error indication packets in terms of the amount of resources required by mobile gateway 10 to handle these error indication packets.

In accordance with the techniques described in this disclosure, rather than send a unknown tunnel endpoint identifier (TEID) in the error indication packets without providing much in the way of additional information that may enable more efficient forms of locating the subscriber record, the techniques may enable mobile gateway 15 to determine additional information, commonly in the form of an Internet protocol (IP) address assigned to the subscriber device, in response to the failure to locate a subscriber record associated with the TEID and send this subscriber IP address in addition to the unknown TEID. By providing this additional information, mobile gateway 10 may perform a more efficient lookup of the subscriber record using the IP address (in comparison to the conventional linear subscriber record scan) by leveraging the existing indexing by mobile gateway 10 of subscriber records by IP addresses. By enabling use of the IP address index to identify the subscriber records, the techniques may drastically reduce the number of operations required to identify a subscriber record in comparison to the conventional linear subscriber record scan.

In operation, mobile gateway 15 receives a packet that includes a downstream tunnel endpoint identifier (TEID) and a destination address. Mobile gateway 15 then, as described above, determines whether the downstream TEID is associated with any one of a number of subscriber records that each stores session data related to one or more sessions established for corresponding wireless devices to communicate with mobile network 2. That is, mobile gateway 15 may extract the downstream TEID and perform a subscriber record lookup using this downstream TEID. The subscriber records, as noted above, may be indexed by the downstream TEID. In response to determining that the downstream TEID is not associated with any one of the subscriber records, mobile gateway 15 generates a message in the form, for example, of an error indication packet that includes both the first TEID and the destination IP address and possibly the source UDP port present in the GTP header of the received packet. Mobile gateway 15 may perform a form of inspect referred to as "deep packet inspection" or "DPI" to extract this IP address, where the inspection is deep in that mobile gateway 15 examines the header of the packet rather than just the tunnel header of the packet encapsulating the packet. While described with respect to an error indication packet, the techniques may be performed with respect to any message indicating that the mobile gateway 15 has determined that the downstream TEID is not associated with any of the subscriber records. Mobile gateway 15 then sends the message to mobile gateway 10.

Mobile gateway 10 receives this message that includes the downstream TEID and the destination IP address from mobile gateway 15. Mobile gateway 10 then extracts the IP address and performs a lookup based on the destination IP address to identify one of the subscriber records associated with the destination IP address and the downstream TEID. That is, mobile gateway 10 performs a lookup of subscriber records by leveraging the destination IP address index of subscriber records. Mobile gateway 10 may locate the one of the subscriber records associated with the destination IP address and the downstream TEID and then delete the identified or located one of the subscriber records associated with the destination address to remove the session between the corresponding wireless device 6 and mobile network 2.

In some instances, IP addresses may not uniquely identify a subscriber (considering that it may be unique to one subnetworks or "subnet" but not across all subnets with which mobile gateway 10 may interact). In these instances, mobile gateway 10 may also parse the UDP port from the message, which may be allocated as described in more detail below to indicate the subnets in which the subscriber is operating. As a result, the message may include the UDP port from the GTP header, as noted above, which mobile gateway 10 may parse and use to perform a lookup of the appropriate routing table associated with the routing instance corresponding to the subnet in which the subscriber is operating. Upon locating the proper routing table, mobile gateway 10 may then perform the lookup of the subscriber record using the IP address, which is unique to this subnet. Thus, use of the term unique may refer to either a globally unique IP address (such as IPv6 addresses) or those that are unique to a subnet (such as many IPv4 addresses).

While described herein with respect to one or more particular architectures for ease of illustration purposes, mobile service provider network 4 may implement any architecture both those set forth by any standards body and those proprietarily owned. Moreover, the techniques may apply to any mobile data protocol supported by these architectures. The techniques therefore should not be limited to cellular architecture referenced herein and the mobile data protocols supported by these architectures. Mobile gateways 10, 15 and other elements of mobile core network 8, as well as base station 14 and other elements of radio access network 7 may, therefore, each represent an abstraction of devices found within any one of the above mobile network architectures.

Figure 2:
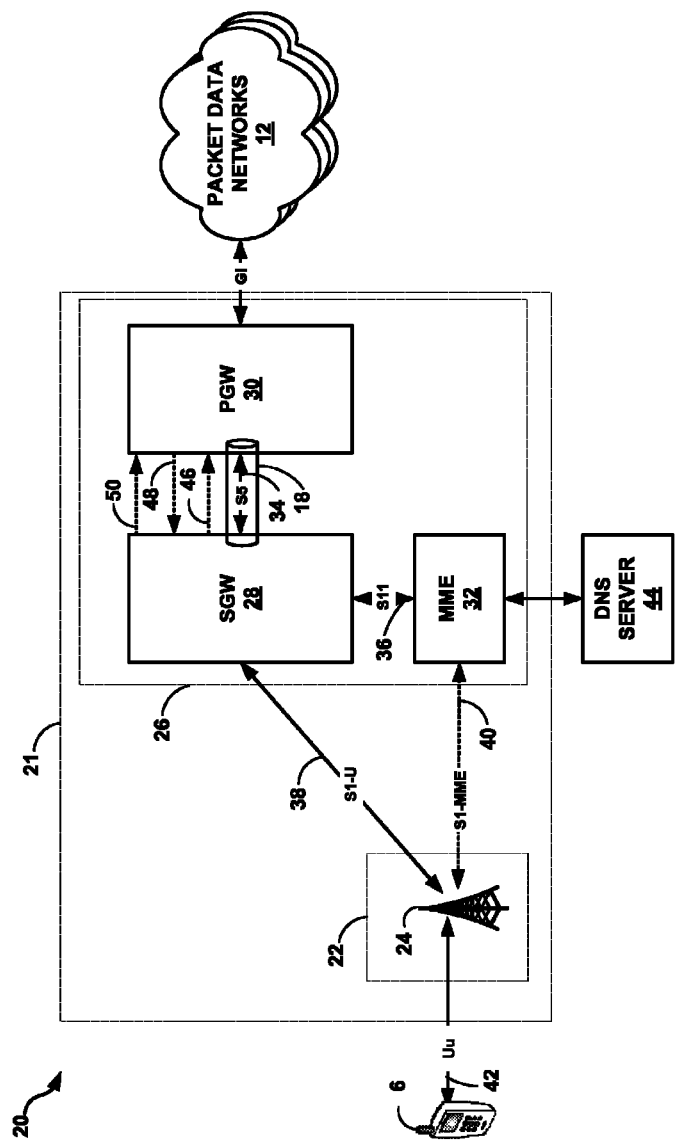
FIG. 2 is a block diagram illustrating an example network system having a service gateway and a PDN gateway that implement the techniques described in this disclosure to facilitate handling of error messages.

FIG. 2 is a block diagram illustrating an example network system 20 having a service gateway (SGW) 28 ("SGW 28") and a PDN gateway (PGW) 30 ("PGW 30") that implement the techniques described in this disclosure to facilitate handling of error messages. Network system 20 may represent an embodiment of network system 2 of FIG. 1. In this example, network system 20 includes a Long Term Evolution (LTE) mobile service provider network 21 ("LTE network 21") that includes an Evolved Packet Core (EPC) 26 interfaced to an Evolved UTRAN (E-UTRAN) 22. LTE network 21 enables and transports service traffic exchanged between wireless device 6 and PDNs 12. EPC 26 and E-UTRAN 22 may represent embodiments of mobile core network 8 and radio access network 7 of FIG. 1, respectively.

EPC 26 provides mobility management, session management, and packet routing and transfer for network system 20. In this example, EPC 26 includes a plurality of PDN Gateways 30A-30B ("PGWs 30") logically connected to Serving Gateway 28 ("SGW 28") via S5 interface 34 operating over one or more communication links. PGWs 30 may represent example instances of mobile gateways 10 of FIG. 1. S5 interface 34 provides protocols to foster user plane tunneling and tunnel management between PGW 30s and SGW 28. S5 interface 34 may comprise a user plane protocol stack that includes GPRS Tunneling Protocol-User Plane (GTP-U) executing over User Datagram Protocol/Internet Protocol (UDP/IP). The term "communication link," as used herein, comprises any form of transport medium, wired or wireless, and can include intermediate nodes such as network devices. SGW 28 hosts mobility anchoring, packet routing and forwarding, lawful interception, and other functionality. PGWs 30 host packet filtering, lawful interception, PDN address allocation, and other functionality.

EPC 26 additionally includes Mobility Management Entity 32 ("MME 32") logically connected to SGW 28 via S11 interface 36 operating over a communication link. S11 interface 36 provides protocols with which MME 32 establishes and manages bearers that traverse or terminate at SGW 28. S11 interface 36 may comprise a control plane protocol stack that includes GTP-Control Plane (GTP-C) executing over UDP/IP. In addition to bearer management and establishment, MME 32 hosts Non-Access Stratum (NAS) signaling, PDNs 12 and SGW 28 selection, roaming, and authentication, for instance. In some embodiments, EPC 26 comprises additional MMEs, SGWs, and/or PGWs.

SGW 28 and MME 32 connect to eNode B 24 ("eNB 24") of E-UTRAN 22 via respective aspects of an S1 interface. Specifically, SGW 28 logically connects to eNB 24 via S1-U interface 38 operating over a communication link, and MME 32 logically connects to eNB 24 via S1-MME interface 40 operating over a communication link to establish bearers over S1-U interface 38 between SGW 28 and eNB 24. S1-U interface 38 may comprise a user plane protocol stack that includes GTP-U operating over UDP/IP. S1-MME interface 40 may comprise a control plane protocol stack that includes S1 Application Protocol (S1-AP) transported by Stream Control Transmission Protocol (SCTP) running over IP. ENB 24 serves wireless device 6 via a radio link to eNB 24 operating over a Uu interface 42 and may represent an example instance of base station 14 of FIG. 1.

LTE network 21 establishes a service bearer for wireless device 6 to PDN 12 for transporting service traffic between the wireless devices and the PDN. Each end-to-end service bearer comprises individual sub-bearers that traverse user plane interfaces, which include Uu interface 42, S1-U interface 38, and S5 interface 34. Conventionally, when wireless device 6 requests packet delivery services from LTE network 21 by sending a NAS Attach Request message toward eNB 24, eNB 24 notifies MME 32 to cause the MME to select a PGW, such as exemplary PGW 30. MME 32 may use any PGW selection process, including the PGW selection process described in "3GPP TS 23.401-General Packet Radio Service (GPRS) enhancements for Evolved Universal Terrestrial Radio Access Network," Section 4.3.8.1, incorporated above. For example, MME 32 may request a PGW network address from Domain Name System (DNS) server 44 for an APN provided by wireless device 6 to MME 32 or a default APN for wireless devices attaching to LTE network 21. DNS server 44 maintains or retrieves from a higher-level DNS server an association between APNs and network addresses of PGWs available to service the associated APNs. DNS server 44 may be local to LTE network 21 or reside in another network. PGW 30 and PDNs 12 communicate using a Gi interface.

In the illustrated example, MME 32 selects PGW 30 to anchor the session requested session for the Attach Request message from wireless device 6. MME 32 therefore issues a Create Session Request message over S11 interface 36 to SGW 28 that includes a number of characteristics of the requested session. The Create Session Request includes, for example, a network address assigned to PGW 30, an International Mobile Subscriber Identifier (IMSI) and Mobile Station International Subscriber Directory Number (MSISDN), APN, radio access technology (RAT) type, and charging characteristics, among other characteristics of the requested session. SGW 28 receives the Create Session Request from MME 32 and generates and sends Create Session Request message 46 to PGW 30 to attempt to establish or reuse an S5 interface 34 bearer between SGW 28 and PGW 30 for the session between wireless device 6 and one of PDNs 12. This Create Session Request message includes the downstream TEID that SGW 28 has allocated to tunnel 18 formed to support this bearer.

Upon receiving Create Session Request message 46, PGW 30 applies a set of profiles to provide additional fine grain control over the requested session. In particular, an administrator configures PGW 30 with the profiles that include a set of rules that define matching criteria and actions. Example criteria may be based on the characteristics for the requested session as received in Create Session Request message 46, such as IMSI, specified APN, and charging and accounting characteristics. Alternatively or additionally, other example criteria may be based on a state or configuration of PGW 30, such as session load, resource utilization, current operating mode, APNs serviced, and others. Alternatively or additionally, other example criteria may be based on user characteristics received from an Authentication, Authorization, and Accounting (AAA) server that associates charging, accounting and other user characteristics with a subscriber using wireless device 6 and provides these characteristics to PGW 30. Example actions that can be defined and executed for matching criteria include redirecting Create Session Request message 46 to another PGW identified within the action, applying lawful intercept to the service, or drop or reject the session by sending a Create Session Response message to SGW 28 rejecting the session requested Create Session Request message 46.

In the example of FIG. 2, PGW 30 associates the new bearer with one of its subscriber records associated with one of the identifiers (e.g., IMSI, MSISDN, TMSI, P-TMSI, etc.) provided in the Crease Session Request message 46. PGW 30 also allocates its own TEID to tunnel 18, which may be referred to as the "upstream TEID." PGW 30 generates a Crease Session Response message 48 that includes the upstream TEID, sending this Crease Session Response message 48 to SGW 28 so as to establish tunnel 18 and the bearer in support of communication between wireless device 6 and one of PDNs 12.

SGW 28 may not receive this message 48 due to failure or may fail when attempting to associate this upstream TEID with the subscriber record with the result that SGW 28 fails to associate this upstream TEID with the subscriber record. SGW 28 may recover from this failure and, having not made this association and otherwise completed the forming of the session, may delete this malformed subscriber record from its subscriber record tables. However, from the perspective of PGW 30, tunnel 18 is a valid tunnel and the session was created for wireless device 6 to access one of PDNs 12. PGW 30 may then send packets from this one of PDNs 12 destined for wireless device 6 to SGW 28 via tunnel 18, encapsulating these packets with the downstream TEID signaled by SGW 28.

Upon receiving these encapsulated packets, SGW 28 performs a subscriber record lookup using the downstream TEID with the result that SGW 28 determines that none of its subscriber records are associated with this downstream TEID, as SGW 28 deleted this subscriber record upon recovering. SGW 28 then generates an error indication packet 50 in accordance with the techniques described in this disclosure that (rather than specify the downstream TEID without providing any other identifiers that identifies wireless device 6) includes both the downstream TEID and the destination IP address (along with the UDP port potentially) parsed from the packet header (which identifies wireless device 6 as this packet is destined for wireless device 6). SGW 28 sends this error indication packet 50 to PGW 30.

PGW 30 receives this error indication packet 50 and extracts the destination IP address identifying wireless device 6 from error indication packet 50. PGW 30 may then perform a subscriber record lookup using this IP address as an index into the subscriber records (and potentially the UDP port as described below in more detail). PGW 30 may implement this index using a hash table or hash function, which hashes the IP address to return a subscriber record identifier. Upon locating this subscriber record, PGW 30 may then delete the subscriber record identified by the subscriber record identifier to delete this session. The one of PDNs 12 may then establish (or re-establish from the perspective of PGW 30) this session to enable communication between this one of PDNs 12 and wireless device 6.

Figure 3:
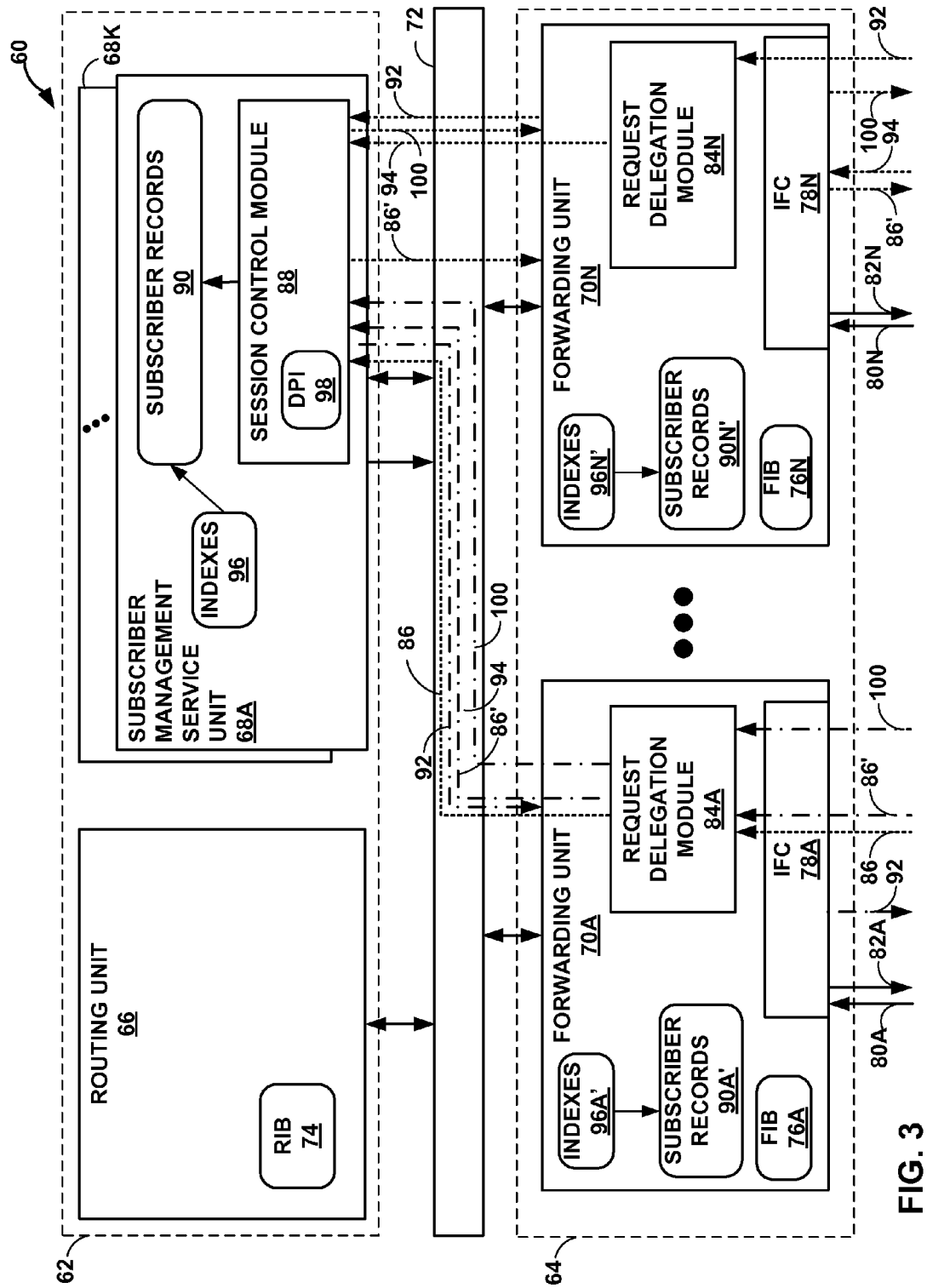
FIG. 3 is a block diagram illustrating, in further detail, an example embodiment of a mobile gateway that implements the techniques described in this disclosure to facilitate handling of error messages.

FIG. 3 is a block diagram illustrating, in further detail, an example embodiment of mobile gateway 60 that implements the techniques described in this disclosure to facilitate handling of error messages. Mobile gateway 60 may represent a more detailed view of either mobile gateway 15 or mobile gateway 10, where the techniques are described below as if mobile gateway 60 represents both mobile gateway 15 and mobile gateway 10 to illustrate in detail the various aspects of the techniques that may be implemented by these two gateways 15 and 10.

In this example, mobile gateway 60 is divided into two logical or physical "planes" to include a first "control" or "routing" plane 62 and a second "data" or "forwarding" plane 64. That is, mobile gateway 60 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or as a hardware that dynamically executes software or a computer program to implement the functionality.

Control plane 62 is a decentralized control plane in that control plane functionality is distributed among routing unit 66 and a plurality of subscriber management service units 68A-68K ("subscriber management service units 68"). Similarly, data plane 64 in this example represents a decentralized data plane in that data plane functionality and packet forwarding functionality is distributed among a plurality of forwarding units 70A-70N ("forwarding units 70"). Each of routing unit 66, subscriber management service units 68, and forwarding units 70 may comprise one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, each of routing unit 66, subscriber management service units 68, and forwarding units 70 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Switch 72 couples routing unit 66, subscriber management service units 68, and forwarding units 70 to deliver data units and control messages among the units. Switch 72 may represent an internal switch fabric or cross-bar, bus, or link. Examples of high-speed multi-stage switch fabrics used as a forwarding plane to relay packets between units within a router are described in U.S. Patent Application 2008/0044181, entitled MULTI-CHASSIS ROUTER WITH MULTIPLEXED OPTICAL INTERCONNECTS. The entire contents of U.S. Patent Application 2008/0044181 are incorporated herein by reference.

Routing unit 66 executes the routing functionality of mobile gateway 60. In this respect, routing unit 66 represents hardware or a combination of hardware and software of control that implements routing protocols (not shown in FIG. 2) by which routing information stored in a routing information base 74 ("RIB 74") may be determined. RIB 74 may include information defining a topology of a network, such as mobile core network 8 shown in the example of FIG. 1. Routing unit 66 may resolve the topology defined by routing information in RIB 74 to select or determine one or more routes through the network. Routing unit 66 may then update data plane 64 with these routes, where forwarding units 70 of data plane 64 store these routes as respective forwarding information bases 76A-76N ("FIBs 76"). Further details of one example embodiment of a router can be found in U.S. patent application Ser. No. 12/182,619, filed July 30, entitled "STREAMLINED PACKET FORWARDING USING DYNAMIC FILTERS FOR ROUTING AND SECURITY IN A SHARED FORWARDING PLANE," which is incorporated herein by reference.

Data plane (alternatively, "forwarding plane") 64 represents hardware or a combination of hardware and software that forward network traffic in accordance with the forwarding information stored to FIBs 76. In the example of mobile gateway 60 of FIG. 2, data plane 64 includes forwarding units 70 that provide high-speed forwarding of network traffic received by interface cards 78A-78N ("IFCs 78") via inbound links 80A-80N to outbound links 82A-82N. Forwarding units 70 may each comprise one or more packet forwarding engine ("PFE") coupled to respective interface cards 78 and may represent, for example, a dense port concentrator (DPC), modular port concentrator (MPC), flexible physical interface card (PIC) concentrator (FPC), or another line card, for example, that is insertable within a mobile gateway 8 chassis or combination of chassis.

Each of forwarding units 70 may include substantially similar components to perform substantially similar functionality, said components and functionality being described hereinafter with respect to forwarding unit 70A. Forwarding unit 70A includes a request delegation module 84A that receives session requests via IFC card 78A and delegates the session requests to a selected one of subscriber management service units 68 according to an association between the respective wireless identifiers or another property of the session requests and the selected service unit 68 for the session request. The association may be a result of a hash or other function performed on session request field values by request delegation module 84A. More information regarding how sessions requests may be delegated using a hash or other function can be found in U.S. patent application Ser. No. 13/172,556, filed Jun. 29, 2011, entitled "MOBILE GATEWAY HAVING DECENTRALIZED CONTROL PLANE FOR ANCHORING SUBSCRIBER SESSIONS," which is incorporated herein by reference.

In the illustrated example, IFC 78A receives session request 86 on inbound interface 80A and forwards the session request to request delegation module 84A. Upon receiving session request 50, request delegation module 84A selects associated service unit 68A to handle the session request and forwards session request 86 to service unit 68A. Request delegation module 84A may process the session request prior to forwarding to service unit 68A to remove GTP and other headers. Session request 86 may represent an example of session request 16 of FIG. 1 and may include, for instance, a Create Session Request message received by mobile gateway 60 acting as a SGW of an LTE network or a Create PDP Context Request received by mobile gateway 60 acting as an SGSN of a GPRS packet-switched network. Session request 86 includes a wireless device identifier (e.g., an IMSI) and may further include an Access Point Name that identifies a packet data network and may in some instances further identify a requested service (e.g., Internet, WAP, or multimedia messaging service (MMS)) provided one of various PDNs, such as PDNs 12. In other words, the APN is a logical name that determines the appropriate gateway (e.g., PGW or GGSN) for the wireless device and by a gateway to determine the services requested by the user or the address of an access point in an external packet network to which user packets from the wireless device should be forwarded.

Subscriber management service units 68 of control plane 62 present a uniform interface to subscriber devices and provide decentralized service session setup and management for mobile gateway 60. That is, all of subscriber management service units 68 are addressable by the same IP or other PDP address, and control messages destined for the same IP or other PDP address of subscriber management service units 68 may therefore be handled by any of the service units. Internally, each of subscriber management service units 68 includes a unique identifier that identifies the service unit to other components of mobile gateway 60. Subscriber management service units 68 identifiers may include, for example, an index, identifying string, internal IP address, or link layer address. Subscriber management service units 68 may each represent, for example, a packet forwarding engine (PFE) or a component of physical interface card insertable within a chassis of mobile gateway 60. The physical interface card may be, for instance, a multi-services dense port concentrator (MS-DPC). Subscriber management service units 68 may also each represent a co-processor executing on a routing node, such as routing unit 66. Subscriber management service units 68 may be alternatively referred to as "service PICs" or "service cards." Each of subscriber management service units 68 includes substantially similar components to perform substantially similar functionality, said components and functionality being described hereinafter with respect to service unit 68A.

Session control module 88 of service unit 68A establishes sessions requested either by PDNs 12 or mobile device 6. Session control module 88 stores session data, received in control plane protocol messages received by session control module 88 or allocated by session control module 88, for one or more sessions managed by service unit 68A in subscriber records 90, which may store so-called "session contexts." Service unit 68A may be referred to as the anchoring service unit for sessions stored in subscriber records 90 in that service unit 68A stores control and forwarding information needed to manage the sessions. Each of subscriber management service units 68 includes an instance of session control module 88 and may therefore independently execute control plane protocols required to establish a session for a subscriber. In this sense, subscriber management service units 68 provide a form of a decentralized control plane for managing subscriber communication sessions. As a result, the mobile gateway 60 may achieve increased scalability to handle thousands or millions of concurrent communication sessions from mobile devices. A session context stored in subscriber records 90 for a session in which a wireless device participates may include, for example, the PDN address allocated for use by the wireless device in sending and receiving user packets, routing information used by service unit 68A in forwarding user packets, such as tunnel endpoint identifiers (TEIDs), and identifiers/addresses for downstream nodes, the APN for the session, and quality of service (QoS) profiles.

Service unit 68A downloads session contexts 90 to forwarding units 70 for storage in respective subscriber records 90A'-90N' ("subscriber records 90'"). Forwarding unit 70A, for instance, receives user packets, maps the user packets to a session context in session contexts 38', and forwards the user packets according to the session context data. For example, forwarding of downstream user packets by forwarding unit 70A for a particular session may include encapsulating the user packets using the GPRS Tunneling Protocol (GTP) and setting the specified upstream or downstream TEID for the session within a GTP header.

Session control module 88 receives session requests, such as session request 86, from forwarding units 70 and handles the session requests by redistributing the session requests to another one of subscriber management service units 68 or by setting up the requested session. Assuming session control module 80 handles the session by setting up the requested session and that mobile gateway 60 represents mobile gateway 15 (or, more specifically, SGW 28 shown in the example of FIG. 2), mobile gateway 15 may allocate a downstream TEID to establish a tunnel between SGW 28 and updates this session request 86 to include the downstream TEID, generating updated session request 86'. Session control module 88 may also update or otherwise create a subscriber record to store this downstream TEID and store this updated or newly created subscriber record as one of subscriber records 90. Session control module 88 may then forward this updated session request 86' to the mobile gateway specified in the original session request 86, which was selected by an MME (such as MME 32 shown in the example of FIG. 2). Session control module 88 may forward this updated session request 86 via forwarding unit 70N, as one example. While shown as directly sending this updated session request 86' via forwarding unit 70, session control module 88 may, in some instances, forward updated session request 86' to the one of forwarding units 70N from which session control module 88 originally received session request 86 (i.e., forwarding unit 70A in this example), which in turn forwards updated session request 86' to forwarding unit 70N.

Next, assuming mobile gateway 60 now represents mobile gateway 10 (or, as a more specific example, PGW 30 shown in the example of FIG. 2), mobile gateway 60 acting as PGW 30 may receive updated session request 86' via IFC 78A of forwarding unit 70A (as one example). Request delegation module 84A of forwarding unit 70A may delegate handling of this session request 86' to, as one example, subscriber management service unit 68A. Forwarding unit 70A then forwards session request 86' to session control module 88 of subscriber management service unit 68A, which proceeds to allocate an upstream TEID for the tunnel between SGW 28 and mobile gateway 60 (assuming again mobile gateway 60 shown in the example of FIG. 3 represents PGW 30). Session control module 88 then updates or, in some instances, creates a new subscriber record for this wireless device (representative of a subscriber) to specify a new session context for the requested session. Session control module 88 may store this updated or new subscriber record as one of subscriber records 90. Service unit 68A may then proceed to update subscriber records 90' of forwarding units 70A to reflect the update to subscriber records 90. Session control module 88 may then generate a session response 92 specifying the upstream TEID, which it then forwards to SGW 28 via forwarding unit 70A.

Assuming now that mobile gateway 60 represents SGW 28, mobile gateway 60 receives session response 92 and thereafter fails, resulting in session response 92 not being processed. Upon recovering from the failure, session control module 88 may analyze subscriber records 90 in an attempt to identify any malformed sessions, such as sessions for which session control module 88 identifies that there is no upstream TEID associated with a session context. Session control module 88 may then delete these malformed subscriber records 90, requiring the one of PDNs 12 or mobile device 6 to again attempt establishment of this malformed session. Subscriber management service unit 68A may, as noted above, update subscriber records 90' in forwarding units 70 to reflect these deletions. In the current example, session control module 88 deletes the one of subscriber records 90 updated or generated in response to session request 86 and pushes this deletion down to forwarding units 70 such that the corresponding one of subscriber records 90' is deleted.

Despite being deleted, PGW 30 may not be aware that this session was not established as PGW 30 has properly, from its perspective, formed the tunnel over which data traffic associated with this session may be sent. PGW 30 may receive a packet destined for mobile device 6 that is to be sent to mobile device 6 via this session from one of PDNs 12, encapsulate this packet with the downstream TEID signaled by mobile gateway 60 (assuming mobile gateway 60 represents SGW 28 in this instance) via updated session request 86', and forward this encapsulated packet to mobile gateway 60. Mobile gateway 60 receives this encapsulated packet as encapsulated packet 94 via IFC 78N of forwarding unit 70N. Forwarding unit 70N may parse the downstream TEID from encapsulated packet 94 and perform a lookup in subscriber records 90N' using the parsed downstream TEID as a key to retrieve the corresponding one of subscriber records 90N', which may specify another TEID (signaled by RNC 14) to use when forwarding this packet downstream to RNC 14.

Forwarding unit 70N may maintain one or more indexes 96N' for subscriber records 90N' that index subscriber records 90N' based at least on the downstream TEIDs allocated by mobile gateway 60 (assuming, again, mobile gateway 60 represents SGW 28). Subscriber management service units 68 may maintain indexes 96 that index subscriber records 90 based on at least the allocated downstream TEIDs, which it may store in forwarding units 70 as respective indexes 96A'-96N' ("indexes 96'"). Forwarding unit 70N may perform this lookup using one of indexes 96N' to facilitate more efficient and quicker lookups of subscriber records. However, considering that the one of subscriber records 90 (and also the ones of subscriber records 90') associated with this downstream TEID have been deleted, forwarding unit 70N determines that no subscriber record exists for this downstream TEID. In response to this determination, forwarding unit 70N forwards encapsulated packet 94 to the one of subscriber management service units 68 associated with this mobile device. In some instances, request delegation module 84N performs a similar process as when initially delegating session request 86 or to select one of session management service units 68. Assuming this encapsulated packet 94 is delegated to service unit 68A, session control module 88 of service unit 68A generates an error message in the form of an error indication packet in accordance with the techniques described in this disclosure.

As shown in the example of FIG. 3, session control module 88 includes a deep packet inspection (DPI) module 98 ("DPI 98"). DPI 98 of session control module 88 performs a form of deep packet inspection to parse the destination IP address from encapsulated packet 94, where this inspection may be considered deep in that normally SGWs do not typically inspect encapsulated packets beyond assessing tunnel headers to determine TEIDs. That is, SGWs do not commonly inspect the IP header or any headers in the network stack below the tunnel header. Thus, DPI 98 may perform a form of deep packet inspection to parse the destination IP address (or, more generally, the IP address allocated for use by wireless device 6) from encapsulated packet 94. Session control module 98 may also parse the downstream TEID and a source UDP port, where the source UDP port may identify the one of service units 68 that forwarded encapsulated packet 94. Session control module 88 may then generate an error indication packet 100 that includes not only the downstream TEID and the source UDP port but also the parsed IP address allocated for use by mobile device 6. Session control module 88 may then forward this error indication packet 100 to PGW 30 via forwarding unit 70N.

Assuming mobile gateway 60 represents PGW 30, mobile gateway 60 receives this error indication packet 100 via IFC 78A of forwarding unit 70A, where request delegation module 84A may forward this error indication packet 100 to each one of subscriber management service units 68. Request delegation module 84A may forward this error indication packet 100 to each one of service units 68 because a given wireless device may maintain multiple sessions with different ones of PDNs 12, each of which may be associated with or identified by a different APN. However, as error indication packet 100 does not typically identify the APN, there is no way to determine to which one of service units 68 error indication packet 100 should be forwarded.

Yet, even when error indication packet 100 is forwarded to each of service units 68, the techniques may facilitate more efficient handling of this error indication packet 100 in comparison to conventional error message handling, as service units 68 may maintain one of indexes 96 that indexes service records 90 based on the IP address allocated to mobile device 6. Each of session control modules 88 may parse the IP address from error indication packet 100 and utilize this IP address one of indexes 96 to quickly identify one of service records 90 associated with mobile device 6 based on the parsed IP address (or not if no subscriber records 90 are identified as associated with the IP address).

One or more of session control modules 88 may then determine whether the downstream TEID specified in this one of subscriber records 90 is associated with the SGW that sent error indication packet 100. That is, error indication packet 100 may also identify SGW (often by IP address allocated for use by the SGW) and the session context stored to each one of these subscriber records 90 may also specify this SGW (often, again, by IP address allocated for use by the SGW). If the SGW IP address specified in the subscriber record matches the one specified in error indication packet 100, the respective one of session control modules 88 deletes the identified one of subscriber records 90. In other words, while TEIDs are not unique across many SGWs (that is, more than one SGW may use the same TEIDs, each TEID is unique to each SGW in that no single SGW may associated two tunnels with the same TEID), the combination of SGW and TEID is unique. Upon identifying a subscriber record specifying the same SGW and TEID as that specified in error indication packet 100, session control module 100 may determine that this session was not properly formed (from the perspective of SGW 28) and delete this record.

To further potentially reduce the number of operations required to handle these error indication packets 100, the techniques may be implemented to allocate a different UDP port to each APN. As noted above, error indication packets include the source UDP port of the encapsulated packets (which is the source UDP port assigned to the APNs). Request delegation module 84A may then parse this UDP port from error indication packet 100 and determine to which of service units 68 to forward error indication packet 100 based on the parsed UDP port. Thus, when implemented in this manner, the techniques may require only a single one of service units 68 to perform the operations described above as being performed by all of service units 68.

In some large deployments where the number of APNs exceed the number of UDP ports available (meaning that APNs cannot be assigned unique UDP ports and one or more APNs may share the same UDP port), the techniques may be slightly modified such that a unique UDP port is allocated to at least a subset or portion of the APNs (often the largest or most accessed APNs) with the remaining APNs (often the smallest or less accessed APNs) being allocated a single shared UDP port, which may still may significantly reduce the number of service units 68 required to handle error indication packets in a number of instances.

While mobile gateway 60 is assumed above to represent both an SGW and a PGW, an SGW may not require as many service units 68 or forwarding units 70 as a PGW. Generally, while assumed to represent both an SGW and a PGW, implementations of SGW may different from implementations of PGWs. The techniques therefore should not be limited to the example of FIG. 3 and may accommodate any implementation of SGWs and PGWs capable of processing error messages, such as error indication packet 100.

Figure 4A:
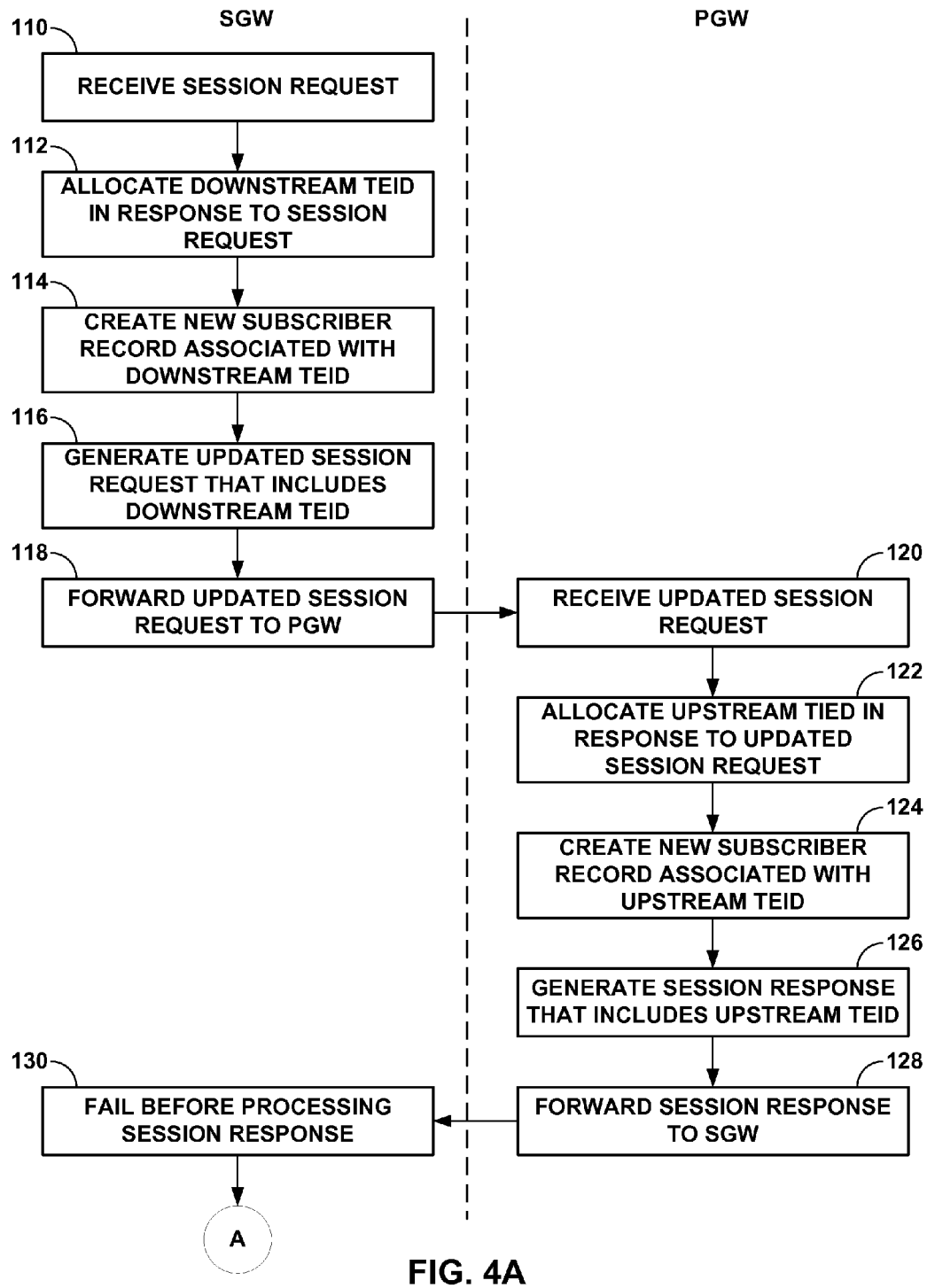
FIGS. 4A-4C are flowcharts illustrating exemplary operation of mobile gateways in performing the error handling techniques described in this disclosure.
Figure 4B:
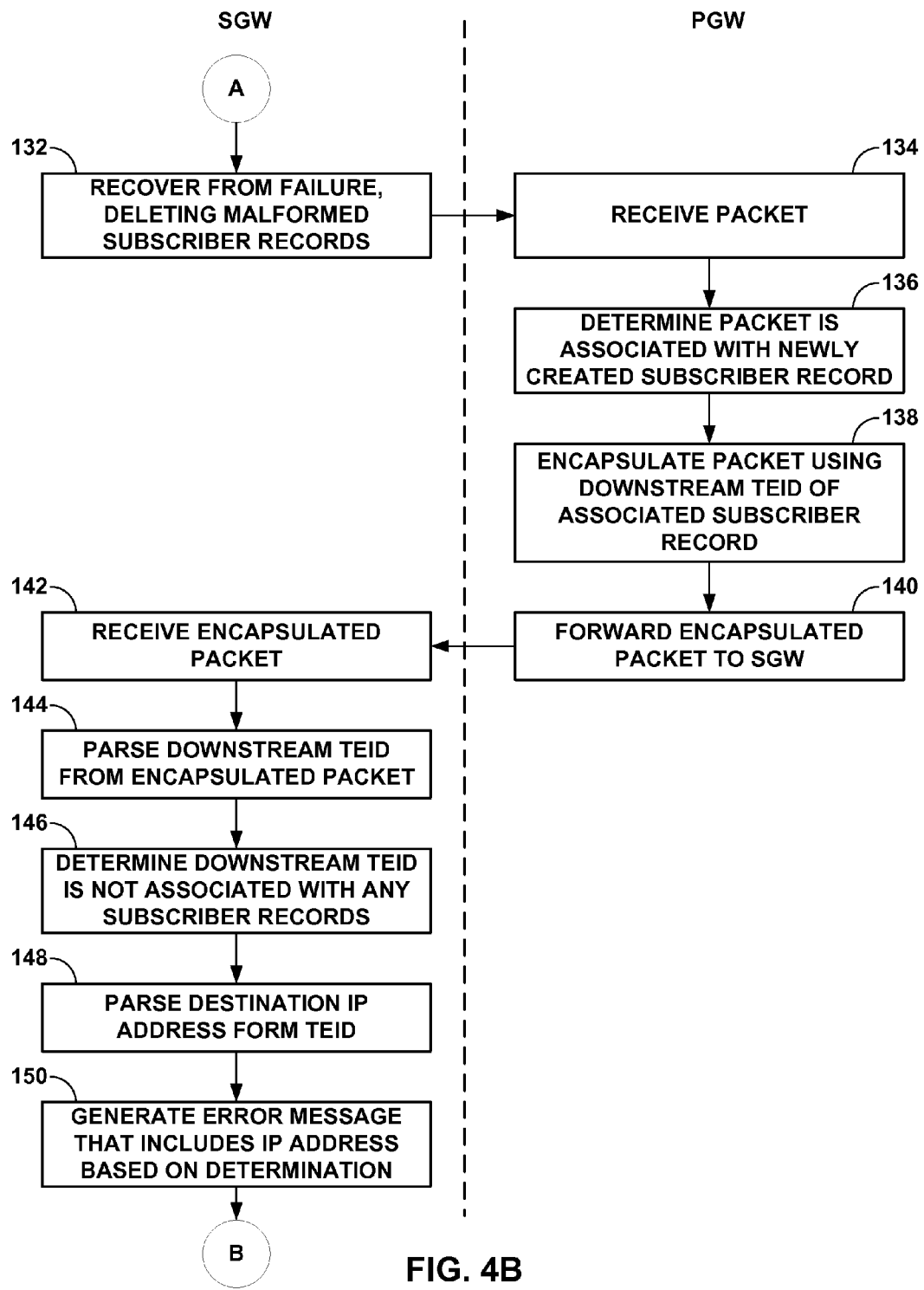
Figure 4C:
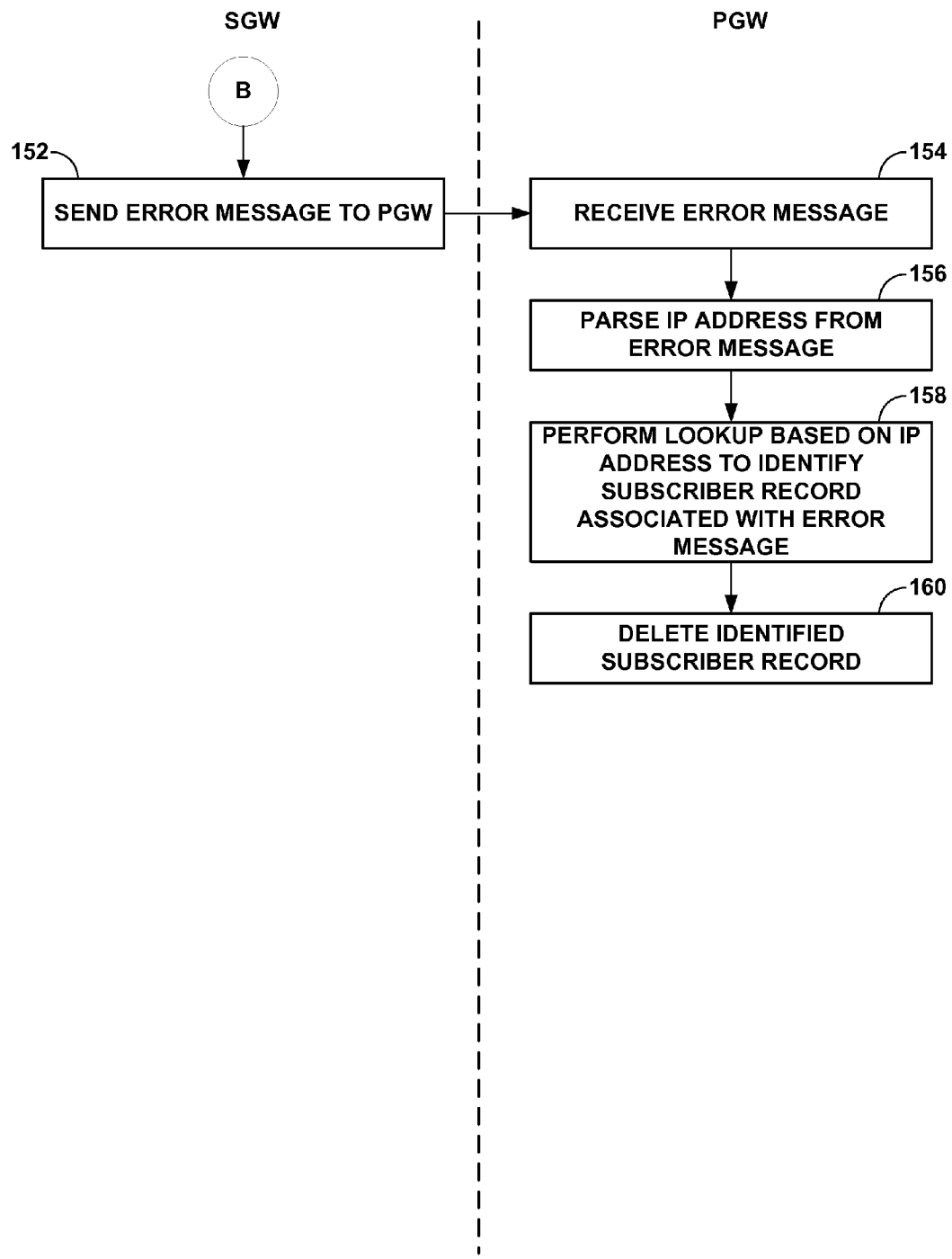

FIGS. 4A-4C are flowcharts illustrating exemplary operation of mobile gateways, such as SGW 28 and PGW 30 shown in the example of FIG. 2, in performing the error handling techniques described in this disclosure. While described above with respect to specific devices, i.e., SGW 28 and PGW 30 in this example, the techniques may be generally implemented by any network devices that may perform error handling in a manner consistent with mobile or other standards employing error messages.

Initially, SGW 28 may receive session request 86 (as shown in the example of FIG. 3, where mobile gateway 60 is assumed to represent SGW 28) via, as one example, IFC 78A of forwarding unit 70A (110). Request delegation module 84A may delegate this request 86 to one of service units 68 (i.e., service unit 68A in this example), where session control module 88 may handle this request 86 by, in part, allocating a downstream TEID for a tunnel established to support this session, as described above (112). Also as described above, session control module 88 may create a new subscriber record and associate this allocated downstream TEID with the new subscriber record (114). Session control module 88 may store this new subscriber record as one of subscriber records 90, which service unit 68A replicates down to forwarding units 70. Session control module 88 may further, as described above, generate updates session request 86', forwarding this updated session request 86' to PGW 30 via, as one example, IFC 78N of forwarding unit 70N (116, 118).

PGW 30 may receive this updated session request 86' via, as one example, IFC 78A of forwarding unit 70A (assuming mobile gateway 60 shown in the example of FIG. 3 now represents PGW 30; 120). Like SGW 28, service unit 68A of PGW 30, which is assumed to have been delegated this session request in the manner described above, also allocates a TEID for the tunnel used to support the session, but rather than allocate a downstream TEID, session control module 88 of service unit 68A allocates an upstream TEID in response to updated session request 86' (122). Session control module 88 also creates a new subscriber record and associates this new subscriber record with the allocated upstream TEID, storing this new subscriber record as one of subscriber records 90 (124). Session control module 88 may then generate a session response 92 that includes the upstream TEID, forwarding this session response 92 via, as one example, IFC 78N of forwarding unit 70N (126, 128).

SGW 30 may then fail before completion of the processing of session response 92 for any of the exemplary reasons noted above (130). SGW 30 may then recover from this failure, where session control modules 88 of each of service units 68 included within SGW 30 may delete malformed subscriber records (such as the newly created one of subscriber records 90 for which an upstream TEID was not received; 132). Subsequently, PGW 30 may receive a data packet via, for example, IFC 78N of forwarding unit 70N (134). Forwarding unit 70N may determine that the packet is associated with the newly created one of subscriber records 90N' by performing a lookup in its subscriber records 90' based on the destination IP address in the IP packet header of the data packet, as described above (136). In the session context of this subscriber record, forwarding unit 70N may identify the downstream TEID signaled by SGW 28 for use in forwarding data packets via the corresponding session. Forwarding unit 70N may then encapsulates the data packet with the downstream TEID by appending a tunnel header that includes the downstream TEID to the data packet, effectively generating encapsulated data packet 94 (138). Forwarding unit 70N then forwards this encapsulated data packet 74 via IFC 78A of forwarding unit 70A to SGW 28 (140).

SGW 28 receives this encapsulated data packet 94 via IFC 78A of forwarding unit 70N (142). Forwarding unit 70N may parse the downstream TEID from data packet 94 (144) and perform a lookup using one of indexes 96N' that indexes subscriber records 90N' based on downstream TEIDs to facilitate more efficient and quicker lookups of subscriber records (146). However, considering that the one of subscriber records 90 (and also the ones of subscriber records 90') associated with this downstream TEID has been deleted, forwarding unit 70N determines that no subscriber record exists for this downstream TEID or, in other words, that the downstream TEID is not associated with any of subscriber records 90N' (148). In response to this determination, forwarding unit 70N forwards encapsulated packet 94 to the one of subscriber management service units 68 associated with this mobile device. In some instances, request delegation module 84N performs a similar process as when initially delegating session request 86 or to select one of session management service units 68. Assuming this encapsulated packet 94 is delegated to service unit 68A, session control module 88 of service unit 68A generates an error message in the form of an error indication packet in accordance with the techniques described in this disclosure.

As shown in the example of FIG. 3, session control module 88 includes a deep packet inspection (DPI) module 98 ("DPI 98"). DPI 98 of session control module 88 performs a form of deep packet inspection to parse the destination IP address from encapsulated packet 94 in the manner described above (148). Session control module 88 may then generate an error indication packet 100 that includes not only the downstream TEID and the source UDP port but also the parsed IP address allocated for use by mobile device 6 (150). Session control module 88 may then forward this error indication packet 100 to PGW 30 via forwarding unit 70N (152).

PGW 30 receives this error indication packet 100 via IFC 78A of forwarding unit 70A (154), where request delegation module 84A may forward this error indication packet 100 to each one of subscriber management service units 68. Request delegation module 84A may forward this error indication packet 100 to each one of service units 68 for the reasons noted above. Each of service units 68 may maintain one of indexes 96 that indexes service records 90 based on the IP address allocated to mobile device 6. Each of session control modules 88 may parse the IP address from error indication packet 100 (156) and utilize this IP address one of indexes 96 to quickly identify one of service records 90 associated with mobile device 6 based on the parsed IP address (or not if no subscriber records 90 are identified as associated with the IP address) (158).

One or more of session control modules 88 may then determine whether the downstream TEID specified in this one of subscriber records 90 is associated with the SGW that sent error indication packet 100, as described above. Upon identifying a subscriber record specifying the same SGW and TEID as that specified in error indication packet 100, session control module 100 may determine that this session was not properly formed (from the perspective of SGW 28) and delete this record (160).

Figure 5:
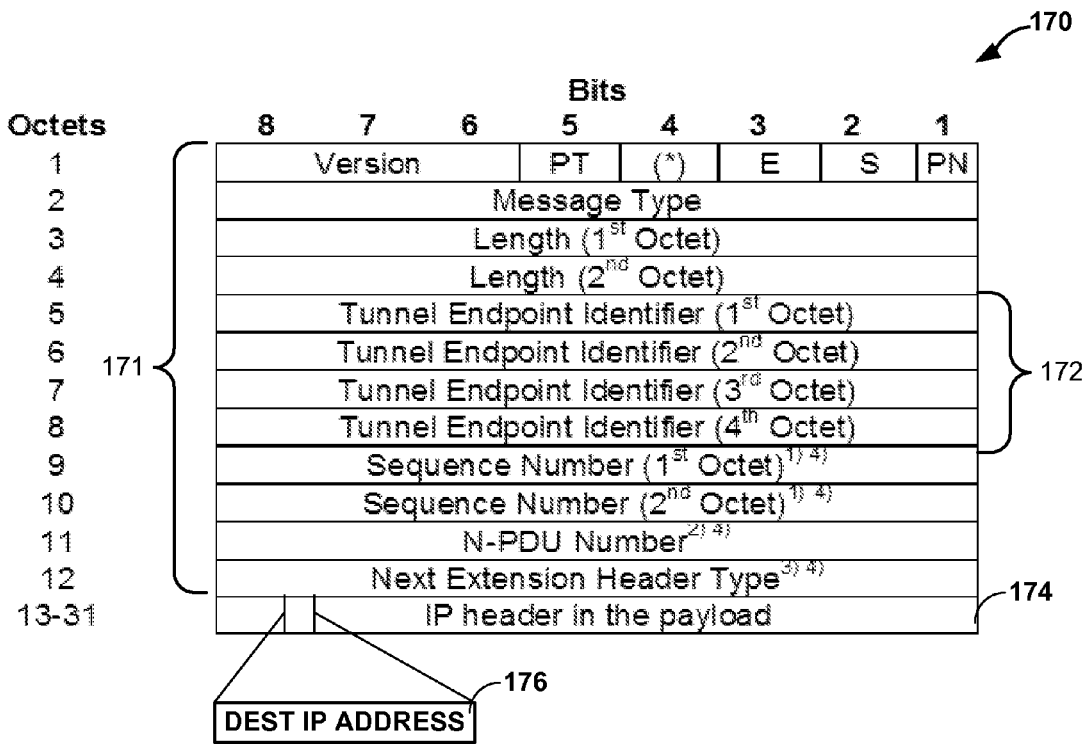
FIG. 5 is a diagram illustrating an example encapsulated data packet.

FIG. 5 is a diagram illustrating an example encapsulated data packet 170. In the example of FIG. 5, encapsulated data packet 170 is 8-bits or 1-octet wide and includes a total of 31 octets. Encapsulated data packet 170 includes a tunnel header 171 (or, more specifically, a GTP-U header) that specifies a tunnel endpoint identifier (TEID) 172. Encapsulated data packet 170 further includes an IP data packet 174 in the payload (which is another way of indicating everything not included in tunnel header 171 of encapsulated data packet 170. The IP header (not shown for ease of illustration purposes) of IP data packet 174 includes a destination IP address 176, where this destination IP address 176, when encapsulated data packet 170 is sent downstream from PGW 30 to SGW 28 (as one example, referring to the example of FIG. 2), specifies the IP address allocated for use by mobile device 6. More information regarding the other fields or portions of tunnel header 171 can be found in the 3GPP technical specification entitled "General Packet Radio System (GPRS) Tunnelling Protocol User Plane (GTPv1-U)," Release 9, dated January, 2010, the entire contents of which are hereby incorporated by reference.

In accordance with the techniques described in this disclosure, DPI 98 of session control module 88 included within a service unit 68A of a mobile gateway 60 (FIG. 3) may parse this destination IP address 176 from the IP header of IP data packet 174. Session control module 88 may then generate an error indication packet, such as error indication packet 180 shown in the example of FIG. 6, that includes this destination IP address.

Figure 6:
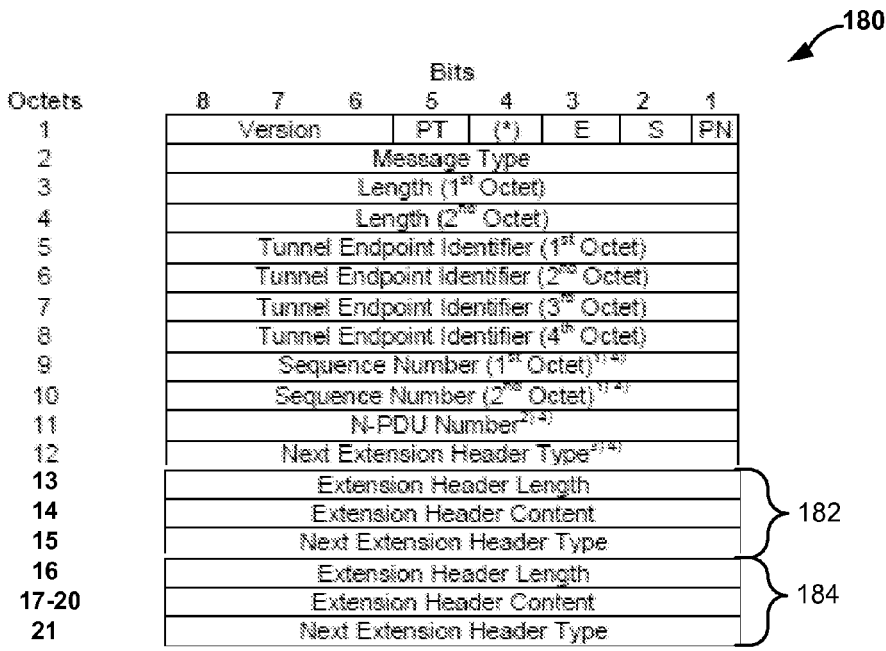
FIG. 6 is a diagram illustrating an error indication packet generated in accordance with the techniques described in this disclosure.

FIG. 6 is a diagram illustrating an error indication packet 180 generated in accordance with the techniques described in this disclosure. Generally, error indication packet 180 includes many of the same fields as tunnel header 171, where again, more information regarding these fields may be generally found in the above incorporated 3GPP technical specification describing GPRS Tunnelling Protocol User Plane (GTPv1-U). The values for the fields however may be different. For example, the message type field may store a different value to indicate that this is an error indication packet rather than a payload packet.

Error indication packet 180 however also includes two additional extension header sets of information elements 182 and 184 not commonly found in tunnel headers appended to data packets. Information elements 182 may specify a source UDP port associated with the mobile gateway sending error indication packet 180, which may be used in the manner described above to further facilitate error handling in accordance with the techniques described in this disclosure. More information regarding these information elements 182 may be found in the above incorporated 3GPP technical specification describing GPRS Tunnelling Protocol User Plane (GTPv1-U). Information elements 184 may specify an IP address associated with a wireless or mobile device, such as mobile device 6. Continuing the example first discussed above with respect to FIG. 5, session control module 88 may store the parsed IP address from packet 170 to one or more of information elements 184. Specifically, session control module 88 may store the IP address to octets 17-20 in the one of information elements 184 denoted as "Extension Header Content."

In this manner, the techniques may enable a mobile gateway to specify an IP address allocated for use by a wireless or mobile device in an error indication packet to facilitate handling of this error by another mobile gateway. While described above with respect to mobile gateways, the techniques may be implemented in other contexts, such as when an RNC fails when processing a session response from an SGSN or SGW. Any network device within the mobile network may therefore implement these techniques to facilitate handling of errors.

Various embodiments of the invention have been described. These and other embodiments are within the scope of the following claims.

The invention claimed is:

1. A method comprising:
receiving, with a downstream mobile gateway of a mobile network, a packet destined for one of a plurality of subscriber devices in the mobile network, wherein the packet is received from an upstream mobile gateway and includes a destination address for the one of the plurality of subscribers and a tunnel endpoint identifier (TEID) that identifies a tunnel between the downstream mobile gateway and the upstream mobile gateway;
determining, with the downstream mobile gateway, whether the TEID is associated with one of a plurality of subscriber records maintained by the downstream mobile gateway that store session data for current sessions associated with the plurality of subscriber devices to communicate with the mobile network;
in response to determining that the TEID is not associated with one of the plurality of subscriber records, generating, with the downstream mobile gateway, a message that includes both the TEID and the destination address and indicates that the downstream mobile gateway has determined that the TEID is not associated with one of the subscriber records for the current sessions; and
sending, with the downstream mobile gateway, the message to the upstream mobile gateway.

2. The method of claim 1,
wherein the packet includes a tunnel header that encapsulates an Internet protocol (IP) packet,
wherein the IP packet includes an IP header that specifies the destination address,
wherein the destination address comprises an IP destination address, and
wherein the method further comprises parsing the IP header of the IP packet encapsulated within the tunnel header to determine the IP destination address.

3. The method of claim 1,
wherein the packet also includes a user datagram protocol (UDP) source port that has been uniquely assigned to an access point name (APN) associated with one of a plurality of packet data networks (PDNs) of the mobile network, and
wherein generating the message comprises generating the message to include each of the TEID, the source UDP port and the destination address.

4. The method of claim 3, wherein APNs associated with the plurality of PDNs of the mobile network have been each uniquely assigned a UDP source port.

5. The method of claim 3,
wherein at least two APNs associated with at least two of the plurality of PNDs have been each uniquely assigned a UDP source port, and
wherein the remaining APNs associated with the remaining ones of the plurality of PDNs are each assigned a common UDP source port.

6. The method of claim 1,
wherein the message comprises an error indication packet that conforms to a mobile networking standard, and
wherein the error indication packet includes an information element specifying the destination address.

7. The method of claim 1,
wherein the downstream mobile gateway comprises a network device within the mobile network designated as either the serving general packet radio service (GPRS) support node (SGSN) or the serving gateway (SGW), and
wherein the upstream mobile gateway comprises a network device within the mobile network designated as either the gateway GPRS support node (GGSN) or the packet data network (PDN) gateway (PGW).

8. The method of claim 1, wherein one or more of the downstream mobile gateway and the upstream mobile gateway comprises a router.

9. A downstream mobile gateway of a mobile network comprising:
at least one forwarding unit that receives a packet destined for one of a plurality of subscriber devices in the mobile network, wherein the packet is received from an upstream mobile gateway and includes a destination address for the one of the plurality of subscribers and a tunnel endpoint identifier (TEID) that identifies a tunnel between the downstream mobile gateway and a upstream mobile gateway; and
a service unit that determines whether the TEID is associated with one of a plurality of subscriber records maintained by the downstream mobile gateway that store session data for current sessions associated with the plurality of subscriber devices to communicate with the mobile network and, in response to determining that the TEID is not associated with one of the plurality of subscriber records, generates a message that includes both the TEID and the destination address and indicates that the downstream mobile gateway has determined that the TEID is not associated with one of the subscriber records for the current sessions,
wherein the forwarding unit sends the message to the upstream mobile gateway.

10. The downstream mobile gateway of claim 9,
wherein the packet includes a tunnel header that encapsulates an Internet protocol (IP) packet,
wherein the IP packet includes an IP header that specifies the destination address,
wherein the destination address comprises an IP destination address, and
wherein the service unit parses the IP header of the IP packet encapsulated within the tunnel header to determine the IP destination address.

11. The downstream mobile gateway of claim 9,
wherein the packet also includes a user datagram protocol (UDP) source port that has been uniquely assigned to an access point name (APN) associated with one of a plurality of packet data networks (PDNs) of the mobile network, and
wherein the service unit generates the message to include each of the TEID, the source UDP port and the destination address.

12. The downstream mobile gateway of claim 11, wherein APNs associated with the plurality of PDNs of the mobile network have been each uniquely assigned a UDP source port.

13. The downstream mobile gateway of claim 11,
wherein at least two APNs associated with at least two of the plurality of PNDs have been each uniquely assigned a UDP source port, and wherein the remaining APNs associated with the remaining ones of the plurality of PDNs are each assigned a common UDP source port.

14. The downstream mobile gateway of claim 9,
wherein the message comprises an error indication packet that conforms to a mobile networking standard, and
wherein the error indication packet includes an information element specifying the destination address.

15. The downstream mobile gateway of claim 9,
wherein the downstream mobile gateway comprises a network device within the mobile network designated as either the serving general packet radio service (GPRS) support node (SGSN) or the serving gateway (SGW), and
wherein the upstream mobile gateway comprises a network device within the mobile network designated as either the gateway GPRS support node (GGSN) or the packet data network (PDN) gateway (PGW).

16. The downstream mobile gateway of claim 9, wherein the downstream mobile gateway comprises a router.

17. A non-transitory computer-readable medium comprising instructions that, when executed, cause one or more processors of a downstream mobile gateway of a mobile network to:
receive a packet destined for one of a plurality of subscriber devices in the mobile network, wherein the packet is received from an upstream mobile gateway and includes a destination address for the one of the plurality of subscribers and a tunnel endpoint identifier (TEID) that identifies a tunnel between the downstream mobile gateway and the upstream mobile gateway;
determine whether the TEID is associated with one of a plurality of subscriber records maintained by the downstream mobile gateway that store session data for current sessions associated with the plurality of subscriber devices to communicate with the mobile network;
in response to determining that the TEID is not associated with one of the plurality of subscriber records, generate a message that includes both the TEID and the destination address and indicates that the downstream mobile gateway has determined that the TEID is not associated with one of the subscriber records for the current sessions; and
send the message to the upstream mobile gateway.

18. A method comprising:
establishing, with an upstream mobile gateway of a mobile network, a plurality of tunnels between the upstream mobile gateway and a downstream mobile gateway that each support a session between a plurality of subscriber devices and the mobile network;
maintaining, with the upstream mobile gateway, a subscriber record for each of the plurality of subscriber devices that store session data for sessions associated with the plurality of subscriber devices to communicate with the mobile network;
receiving, with the upstream mobile gateway, a message from the downstream mobile gateway that includes a destination address associated with one of the subscriber devices and a tunnel endpoint identifier (TEID) that identifies one of the plurality of tunnels and indicates that the downstream mobile gateway has determined that the included TEID is not associated with one of the subscriber records maintained by the downstream gateway device;
performing, with the upstream mobile gateway, a lookup based on the destination address included within the message to identify one of the plurality of subscriber records maintained by the upstream mobile gateway that is associated with the destination address and the included TEID; and
deleting, with the upstream mobile gateway, the identified one of the plurality of subscriber records maintained by the upstream mobile gateway and associated with the destination address to remove the session between the corresponding one of the plurality of subscriber devices and the mobile network.

19. The method of claim 18, wherein performing the lookup comprises applying a hash function to the destination address to identify the one of the plurality of subscriber records associated with the destination address and the second TEID.

20. The method of claim 18,
wherein message includes each of the TEID, a source user datagram protocol (UDP) source port and the destination address,
wherein the UDP source port has been uniquely assigned to one of a plurality of access point names (APNs),
wherein each of the plurality of APNs is associated with a corresponding one of a plurality of packet data networks (PDNs) of the mobile network,
wherein the method further comprises storing the plurality of subscriber records in sets of subscriber records such that each of the sets of subscriber records is stored for a different one of the APNs, and
wherein performing the lookup comprises performing the lookup based on the destination address in the set of subscriber records for the one of the plurality of APNs uniquely to which the UDP source port has been uniquely assigned.

21. The method of claim 20, wherein each of the plurality of APNs have been uniquely assigned a UDP source port.

22. The method of claim 20,
wherein each of at least two of the plurality of APNs associated with at least two of the plurality of PNDs have been uniquely assigned a UDP source port, and
wherein the remaining ones of the plurality of APNs associated with the remaining ones of the plurality of PDNs are each assigned a common UDP source port.

23. The method of claim 18,
wherein the message comprises an error indication packet that conforms to a mobile networking standard, and
wherein the error indication packet includes an information element specifying the destination address.

24. The method of claim 18,
wherein the upstream mobile gateway comprises a network device within the mobile network designated as either the gateway general packet radio service (GPRS) support node (GGSN) or the packet data network (PDN) gateway (PGW), and
wherein the downstream mobile gateway comprises a network device within the mobile network designated as either the serving GPRS support node (SGSN) or the serving gateway (SGW).

25. The method of claim 18, wherein the upstream mobile gateway and downstream mobile gateway comprises a router.

26. An upstream mobile gateway of a mobile network comprising:
at least one service unit that establishes a plurality of tunnels between the upstream mobile gateway and a downstream mobile gateway that each support a session between a plurality of subscriber devices and the mobile network, and maintains a subscriber record for each of the plurality of subscriber devices that store session data for sessions associated with the plurality of subscriber devices to communicate with the mobile network; and a forwarding unit that receives a message that includes a destination address associated with one of the subscriber devices and a tunnel endpoint identifier (TEID) that identifies one of the plurality of tunnels and indicates that the downstream mobile gateway has determined that the included TEID is not associated with one of the subscriber records maintained by the downstream gateway device and performs a lookup based on the destination address included within the message to identify one of the plurality of subscriber records maintained by the upstream mobile gateway that is associated with the destination address and the included TEID, wherein the at least one service unit deletes the identified one of the plurality of subscriber records maintained by the upstream mobile gateway and associated with the destination address to remove the session between the corresponding one of the plurality of subscriber devices and the mobile network.

27. The upstream mobile gateway of claim 26, wherein the service unit applies a hash function to the destination address to identify the one of the plurality of subscriber records associated with the destination address and the second TEID.

28. The upstream mobile gateway of claim 26, wherein message includes each of the TEID, a source user datagram protocol (UDP) source port and the destination address, wherein the UDP source port has been uniquely assigned to one of a plurality of access point names (APNs), wherein each of the plurality of APNs is associated with a corresponding one of a plurality of packet data networks (PDNs) of the mobile network, wherein the service unit stores the plurality of subscriber records in sets of subscriber records such that each of the sets of subscriber records is stored for a different one of the APNs and performs the lookup based on the destination address in the set of subscriber records for the one of the plurality of APNs uniquely to which the UDP source port has been uniquely assigned.

29. The upstream mobile gateway of claim 28, wherein each of the plurality of APNs have been uniquely assigned a UDP source port.

30. The upstream mobile gateway of claim 28, wherein each of at least two of the plurality of APNs associated with at least two of the plurality of PNDs have been uniquely assigned a UDP source port, and wherein the remaining ones of the plurality of APNs associated with the remaining ones of the plurality of PDNs are each assigned a common UDP source port.

31. The upstream mobile gateway of claim 26, wherein the message comprises an error indication packet that conforms to a mobile networking standard, and wherein the error indication packet includes an information element specifying the destination address.

32. The upstream mobile gateway of claim 26, wherein the upstream mobile gateway comprises a network device within the mobile network designated as either the gateway general packet radio service (GPRS) support node (GGSN) or the packet data network (PDN) gateway (PGW), and wherein the downstream mobile gateway comprises a network device within the mobile network designated as either the serving GPRS support node (SGSN) or the serving gateway (SGW).

33. The method of claim 26, wherein one or more of the upstream mobile gateway and downstream mobile gateway comprises a router.

34. A non-transitory computer-readable medium comprising instruction that, when executed, cause one or more processors of an upstream mobile gateway of a mobile network to:

establish a plurality of tunnels between the upstream mobile gateway and a downstream mobile gateway that each support a session between a plurality of subscriber devices and the mobile network;

maintain a subscriber record for each of the plurality of subscriber devices that store session data for sessions associated with the plurality of subscriber devices to communicate with the mobile network;

receive a message that includes a destination address associated with one of the subscriber devices and a tunnel endpoint identifier (TEID) that identifies one of the plurality of tunnels and indicates that the downstream mobile gateway has determined that the included TEID is not associated with one of the subscriber records maintained by the downstream gateway device;

perform a lookup based on the destination address included within the message to identify one of the plurality of subscriber records maintained by the upstream mobile gateway that is associated with the destination address and the included TEID; and delete the identified one of the plurality of subscriber records maintained by the upstream mobile gateway and associated with the destination address to remove the session between the corresponding one of the plurality of subscriber devices and the mobile network.

35. A network system comprising:

a mobile network that includes:

a plurality of subscriber devices;

a downstream mobile gateway; and an upstream mobile gateway that comprises includes at least one service unit that establishes a plurality of tunnels between the upstream mobile gateway and the downstream mobile gateway that each support a session between the plurality of subscriber devices and the mobile network, and maintains a subscriber record for each of the plurality of subscriber devices that store session data for sessions associated with the plurality of subscriber devices to communicate with the mobile network, wherein the downstream mobile gateway includes:

at least one forwarding unit that receives a packet destined for one of the plurality of subscribers, wherein the packet is received from the upstream mobile gateway and includes a destination address for the one of the plurality of subscribers and a tunnel endpoint identifier (TEID) that identifies a tunnel between the downstream mobile gateway and the upstream mobile gateway; and a service unit that determines whether the TEID is associated with one of a plurality of subscriber records maintained by the downstream mobile gateway that store session data for current sessions associated with the plurality of subscriber devices to communicate with the mobile network and, in response to determining that the TEID is not associated with one of the plurality of subscriber records, generates a message that includes both the TEID and the destination address and indicates that the downstream mobile gateway has determined that the TEID is not associated with one of the subscriber records for the current sessions, wherein the forwarding unit of the downstream mobile gateway sends the message to the upstream mobile gateway, wherein the upstream mobile gateway further includes a forwarding unit that receives the message and performs a lookup based on the destination address included within the message to identify one of the plurality of subscriber records maintained by the upstream mobile gateway that is associated with the destination address and the included TEID, and wherein the at least one service unit of the upstream mobile gateway deletes the identified one of the plurality of subscriber records maintained by the upstream mobile gateway and associated with the destination address to remove the session between the corresponding one of the plurality of subscriber devices and the mobile network.

* * * * *